United States Patent
Khan

(10) Patent No.: US 11,741,365 B2
(45) Date of Patent: Aug. 29, 2023

(54) GENERALIZABLE AND INTERPRETABLE DEEP LEARNING FRAMEWORK FOR PREDICTING MSI FROM HISTOPATHOLOGY SLIDE IMAGES

(71) Applicant: TEMPUS LABS, INC., Chicago, IL (US)

(72) Inventor: Aly Azeem Khan, Chicago, IL (US)

(73) Assignee: TEMPUS LABS, INC., Chicago, IL (US)

( * ) Notice: Subject to any disclaimer, the term of this patent is extended or adjusted under 35 U.S.C. 154(b) by 973 days.

(21) Appl. No.: 16/412,362

(22) Filed: May 14, 2019

(65) Prior Publication Data
US 2019/0347557 A1  Nov. 14, 2019

Related U.S. Application Data

(60) Provisional application No. 62/671,300, filed on May 14, 2018.

(51) Int. Cl.
| | | |
|---|---|---|
| G06N 5/02 | (2023.01) | |
| G06N 3/084 | (2023.01) | |
| G06N 20/10 | (2019.01) | |

(52) U.S. Cl.
CPC ............ *G06N 3/084* (2013.01); *G06N 5/02* (2013.01); *G06N 20/10* (2019.01)

(58) Field of Classification Search
CPC .......... G06N 3/084; G06N 5/02; G06N 20/10
See application file for complete search history.

(56) References Cited

U.S. PATENT DOCUMENTS

| | | |
|---|---|---|
| 6,463,438 B1 | 10/2002 | Veltri et al. |
| 9,996,664 B2 | 6/2018 | Lloyd et al. |
| 10,049,450 B2 | 8/2018 | Madabhushi et al. |
| 10,078,895 B2 | 9/2018 | Madabhushi et al. |
| 10,102,418 B2 | 10/2018 | Bredno et al. |

(Continued)

FOREIGN PATENT DOCUMENTS

| | | |
|---|---|---|
| CN | 107369151 A | 11/2017 |
| WO | 2004/081564 A1 | 9/2004 |

(Continued)

OTHER PUBLICATIONS

Popovici et al ("Image-based surrogate biomarkers for molecular subtypes of colorectal cancer" Jan. 2017) (Year: 2017).*

(Continued)

*Primary Examiner* — Lut Wong
(74) *Attorney, Agent, or Firm* — Marshall, Gerstein & Borun LLP

(57) ABSTRACT

A generalizable and interpretable deep learning model for predicting microsatellite instability from histopathology slide images is provided. Microsatellite instability (MSI) is an important genomic phenotype that can direct clinical treatment decisions, especially in the context of cancer immunotherapies. A deep learning framework is provided to predict MSI from histopathology images, to improve the generalizability of the predictive model using adversarial training to new domains, such as on new data sources or tumor types, and to provide techniques to visually interpret the topological and morphological features that influence the MSI predictions.

15 Claims, 14 Drawing Sheets

(56) References Cited

U.S. PATENT DOCUMENTS

| | | |
|---|---|---|
| 10,426,442 B1 | 10/2019 | Schnorr |
| 10,699,163 B1 | 6/2020 | Shah et al. |
| 10,957,041 B2 | 3/2021 | Yip et al. |
| 11,263,748 B2 | 3/2022 | Yip et al. |
| 2003/0215936 A1 | 11/2003 | Kallioniemi et al. |
| 2006/0064248 A1 | 3/2006 | Saidi et al. |
| 2007/0216909 A1 | 9/2007 | Everett et al. |
| 2010/0111396 A1 | 5/2010 | Boucheron |
| 2011/0188728 A1 | 8/2011 | Sammak et al. |
| 2014/0073922 A1 | 3/2014 | Mammone |
| 2014/0140607 A1 | 5/2014 | Jonas |
| 2014/0337052 A1 | 11/2014 | Pellini et al. |
| 2015/0100246 A1 | 4/2015 | Remzi et al. |
| 2016/0042511 A1 | 2/2016 | Chukka et al. |
| 2016/0063724 A1 | 3/2016 | Tunstall et al. |
| 2016/0103973 A1 | 4/2016 | Singal et al. |
| 2016/0110584 A1 | 4/2016 | Remiszewski et al. |
| 2016/0217253 A1 | 7/2016 | Newman et al. |
| 2016/0253466 A1 | 9/2016 | Agaian et al. |
| 2016/0333420 A1 | 11/2016 | Stern et al. |
| 2017/0076046 A1 | 3/2017 | Barnes et al. |
| 2017/0076442 A1 | 3/2017 | Schoenmeyer et al. |
| 2017/0233827 A1 | 8/2017 | Moffitt et al. |
| 2017/0337682 A1 | 11/2017 | Liao et al. |
| 2018/0005136 A1 | 1/2018 | Gai et al. |
| 2018/0075597 A1 | 3/2018 | Liu et al. |
| 2018/0089373 A1 | 3/2018 | Matsuguchi et al. |
| 2018/0121759 A1 | 5/2018 | Gabrani et al. |
| 2018/0129911 A1 | 5/2018 | Madabhushi et al. |
| 2018/0137394 A1 | 5/2018 | Wenzel et al. |
| 2018/0203974 A1 | 7/2018 | Venn |
| 2018/0239949 A1 | 8/2018 | Chander et al. |
| 2018/0276339 A1 | 9/2018 | Planey et al. |
| 2018/0340870 A1 | 11/2018 | Gustafson et al. |
| 2019/0034591 A1 | 1/2019 | Mossin et al. |
| 2019/0043242 A1 | 2/2019 | Risser |
| 2019/0087532 A1 | 3/2019 | Madabhushi et al. |
| 2019/0169685 A1 | 6/2019 | Georgiadis et al. |
| 2019/0392580 A1 | 12/2019 | Kapil et al. |
| 2020/0105417 A1 | 4/2020 | Dolan |
| 2020/0381104 A1 | 12/2020 | Ceballos et al. |

FOREIGN PATENT DOCUMENTS

| | | |
|---|---|---|
| WO | 2016/118860 A1 | 7/2016 |
| WO | 2017/087415 A1 | 5/2017 |
| WO | 2017/198790 A1 | 11/2017 |
| WO | 2018/065434 A1 | 4/2018 |
| WO | 2018/067937 A1 | 4/2018 |
| WO | 2018/136664 A1 | 7/2018 |
| WO | 2018/156133 A1 | 8/2018 |
| WO | 2018/158412 A1 | 9/2018 |
| WO | 2018/165103 A1 | 9/2018 |
| WO | 2018/191553 A1 | 10/2018 |
| WO | 2018/231771 A1 | 12/2018 |

OTHER PUBLICATIONS

Zhang et al ("Aspect-augmented Adversarial Networks for Domain Adaptation" 2017) (Year: 2017).*

Springenberg et al ("Striving for Simplicity: The All Convolutional Net" 2015) (Year: 2015).*

Mehta et al ("Multilabel multiclass classification of OCT images augmented with age, gender and visual acuity data" May 8, 2018) (Year: 2018).*

"John Hopkins University Study Finds Laboratory-Developed Liquid Biopsy Tets Can Give Different Results; Call for 'Improved Certification' of Medical Laboratories That Develop These LDTs", Dark Daily, 6 pages (2018).

"Technical Specifications," FoundationOne (Registered) Liquid, Foundation Medicine, Inc. (2018).

Abels et al., "Current State of the Regulatory Trajectory for Whole Slide Imaging Devices in the USA," Journal of Pathology Informatics 8, 5 pages (2017).

Ayers et al., "IFN-g-related mRNA profile predicts clinical response to PD-1 blockade," The Journal of Clinical Investigation 127(8):2930-2940 (2017).

Bandi et al., "From detection of individual metastases to classification of lymph node status at the patient level: the CAMELYON17 challenge," IEEE Transactions on Medical Imaging 38:550-560 (2019).

Beaubier et al., "Clinical validation of the tempus xT next-generation targeted oncology sequencing assay," Oncotarget 10:2384-2396 (2019).

Bejnordi et al., "Diagnostic Assessment of Deep Learning Algorithms for Detection of Lymph Node Metastases in Women with Breast Cancer," Jama 318:2199-2210 (2017).

Brugnara et al., "Management Training for Pathology Residents: I. Results of a National Survey," American journal of clinical pathology 101:559-563 (1994).

Caravagna et al., "Algorithimic methods to infer the evolutionary trajectories in cancer progression," PNAS 113(28):E4025-E4034 (2016).

Carter et al,. "Absolute quantification of somatic DNA alterations in human cancer," Nature Biotechnology 30:413-421 (2012).

Clark et al., "Analytical Validation of a Hybrid Capture—Based Next-Generation Sequencing Clinical Assay for Genomic Profiling of Cell-Free Circulating Tumor DNA," The Journal of Molecular Diagnostics 20(5):686-702 (2018).

Cortes-Ciriano et al., "A molecular portrait of microsatellite instability across multiple cancers," Nature Communications 8:12 pages (2017).

Coudray et al., "Classification and Mutation Prediction from Non-Small Cell Lung Cancer Histopathology Images Using Deep Learning," bioRxiv, 23 pages (2017).

Cruz-Roa et al., "Accurate and reproducible invasive breast cancer detection in whole-slide images: A Deep Learning approach for quantifying tumor extent," Scientific Reports 7:46450, 14 pages (2017).

Daume et al., "Domain Adaptation for Statistical Classifiers," Journal of Artificial Intelligence Research 26:101-126 (2006).

Dienstmann et al., "Consensus molecular subtypes and the evolution of precision medicine in colorectal cancer," Nature Reviews Cancer 17, 14 pages (2017).

Esteva et al., "Dermatologist-level classification of skin cancer with deep neural networks," Nature 542:115-118 (2017).

Evaluation of Automatic Class III Designation for MSK-Impact (Integrated Mutation Profiling of Actionable Cancer Targets), Decision Summary, 57 pp. (publicly available before May 14, 2018).

Fabrizio et al., "Beyond microsatellite testing: assessment of tumor mutational burden identifies subsets of colorectal cancer who may respond to immune checkpoint inhibition," Journal of Gastrointestinal Oncology, 9(4):610-617 (2018).

FoundationOne CDx (Trademark) Technical Information, Foundation Medicine, Inc., Cambridge, Massachusetts, 43 pp. (Nov. 2017).

FoundationOne Liquid, Genomic Testing 6 pages (2019).

Gan et al, "Applicability of Next Generation Sequencing Technology in Microsatellite Instabilty Testing," Genes 6:46-59 (2015).

Ganin et al., "Domain-Adversarial Training of Neural Networks," The Journal of Machine Learning Research 17:2096-2030 (2016).

Grossman ete al., "Toward a Shared Vision for Cancer Genomic Data," The New England Journal of Medicine 375:1109-1112 (2016).

Gutman et al., "The Digital Slide Archive: A Software Platform for Management, Integration, and Analysis of Histology for Cancer Research," Cancer Research 77:e75-e78 (2017).

Hause et al., "Classification and characterization of microsatellite instability across 18 cancer types," Nature Medicine 22:1342-1350 (2016).

He et al., "Deep Residual Learning for Image Recognition," Proceedings of the IEEE conference on computer vision and pattern recognition 770-778 (2016).

International Search Report and Written Opinion from International Application No. PCT/US19/32313 dated Jul. 26, 2019.

(56) References Cited

OTHER PUBLICATIONS

Kather et al., "Deep learning can predict microsatellite instability directly from histology in gastrointestinal cancer," Nature Medicine 25:1054-1054 (2019).
Kather et al., "Predicting survival from colorectal cancer histology slides using deep learning: A retrospective multicenter study," PLoS medicine 16, e1002730, 22 pages (2019).
Kim et al., "The Landscape of Microsatellite Instability in Colorectal and Endometrial Cancer Genomes," Cell 155(4), 21 pages (2013).
Kurakin et al., "Adversarial Examples in the Physical World," Technical report (2016).
LeCun et al., "Deep Learning," Nature 521:436-444 (2015).
Lemery et al., "First FDA Approval Agnostic of Cancer Site—When a Biomarker Defines the Indication," N Engl J Med 377:1409-1412 (2017).
Levenson et al., "Pigeons (*Columba livia*) as Trainable Observers of Pathology and Radiology Breast Cancer Images," PLoS One 10, 21 pages e0141357 (2015).
Levine et al., "Rise of the Machines: Advances in Deep Learning for Cancer Diagnosis," Trends in Cancer 5(3):157-169 (2019).
Liu et al., "Detecting Cancer Metastases on Gigapixel Pathology Images," 13 pages (2017).
Lowe, Distinctive Image Features from Scale-Invariant Keypoints, Int. J. Computer Vision, 28 pp. (Jan. 2004).
Mobadersany et al., "Predicting cancer outcomes from histology and genomics using convolutional networks," Proceedings of the National Academy of Sciences 115:E2970-E2979 (2018).
Murphy et al., "Comparison of the Microsatellite Instability Analysis System and the Bethesda Panel for the Determination of Microsatellite Instability in Colorectal Cancers," Journal of Molecular Diagnostics 8(3):305-311 (2006).
Newburn, "Understanding the role of Human Leukocyte Antigen in Cancer Immunotherapy," Personalis, 4 pages (2019).
Pardoll, "The blockade of immune checkpoints in cancer immunotherapy," Nature Reviews Cancer 12:252-264 (2012).
PMA P170019: FDA Summary of Safety and Effectiveness of Data, FoundationOne CDx (Trademark), 58 pp. (Nov. 30, 2017).
Press Release—Guardant Health Presents Data on Immunotherapy-related Biomarkers MSI and TMB in blood of advanced cancer patients at European Society of Medical Oncology Annual Meeting, 4 pages, (2018).
Saltz et al., "Spatial Organization and Molecular Correlation of Tumor-Infiltrating Lymphocytes Using Deep Learning on Pathology Images," Cell Reports 23:181-193 (2018).
Schaumberg et al., "H&E-stained Whole Slide IMage Deep Learning Predicts SPOP Mutation State in Prostate Cancer," bioRxiv, pp. 1-14 (2016).
Simonyan et al., "Very Deep Convolutional Networks for Large-Scale Image Recognition," 10 pages, (2014).
Springenberg et al., "Striving for Simplicity: The All Convolutional Net," ICLR (2014).
Szegedy et al., "Going Deeper with Convolutions," IEEE, 9 pages (2015).
Thorsson et al, "The Immune Landscape of Cancer," Immunity 48:812-830 (2018).
Anders et al., Differential expression analysis for sequence count data, Genome Biology, 11:R106 (2010).
Bensch et al., 89Zr-atezolizumab imaging as a non-invasive approach to assess clinical response to PD-L1 blockade in cancer, Nat. Med., 24:1852-1858 (2018).
Chang et al., Deep-learning convolutional neural networks accurately classify genetic mutations in gliomas, Am J. Neuroradiology, (2018).
Chang et al., Residual convolution neural network for determination of IDH status in low- and high-grade gliomas from MR imaging, Clin. Cancer Res., 24(5):1073-1081 (2018).
Chen et al., Microscope 2.0: An augmented reality microscope with real-time artificial integration, Nat. Med., 25:1453-1457 (2019).
Chen et al., Pathomic fusion: An integrated framework for fusing histopathology and genomic features for cancer diagnosis and prognosis, downloaded from the Internet at: <https://arxiv.org/pdf/1912.08937v1.pdf> (Dec. 18, 2019).
Department of health and human services. Part I. overview information, Integration of imaging and fluid-based tumor monitoring in cancer therapy (R01 Clinical Trial Optional), (Feb. 5, 2018).
Dey et al., Visualizing the structure of RNA-seq expression data using grade of membership models, PLoS Genetics, 13(5) (2017).
FDA Summary of safety and effectiveness data (SSED), PD-L1 IHC 22C3 pharmDx, Dako North America, Inc., (Oct. 2, 2015).
FDA Summary of safety and effectiveness data (SSED), PD-L1 IHC 22C3 pharmDx, Dako North America, Inc., (Sep. 22, 2017).
KEYTRUDA medication guide, p. 46, from prescribing information guide, Merck & Co. Inc., revised (Sep. 2017) (Reference ID: 4156447).
Letter from U.S. Department of Health & Human Services to Agfa Healthcare N.V., regarding Enterprise Imaging XERO Viewer 8.1, dated (Jul. 3, 2017).
Letter from U.S. Department of Health & Human Services to Arterys, Inc. regarding Arterys Software v2.0, dated (Oct. 28, 2016).
Letter from U.S. Department of Health & Human Services to Arterys, Inc. regarding Arterys Viewer, dated (Jul. 18, 2017).
Letter from U.S. Department of Health & Human Services to Brainlab AG regarding DICOM Viewer, dated (Apr. 13, 2016).
Letter from U.S. Department of Health & Human Services to Healthmyne Inc. regarding Healthmyne PACS, dated (Aug. 20, 2015).
Letter from U.S. Department of Health & Human Services to Healthmyne Inc. regarding Healthmyne, dated (Jan. 15, 2016).
Letter from U.S. Department of Health and Human Services to Philips Medical Systems Nederland B.V. regarding Philips Intellisite Pathology Solution (PIPS), dated (Oct. 13, 2017).
Letter from U.S. Food & Drug Administration to Arterys, Inc. regarding Arterys Oncology DL, dated (Jan. 25, 2018).
Letter from U.S. Food & Drug Administration to Dako North America, Inc. regarding PD-L1 IHC 22C3 pharmDx, dated (Aug. 16, 2018).
Letter from U.S. Food & Drug Administration to Dako North America, Inc. regarding PD-L1 IHC 22C3 pharmDx, dated (Jun. 12, 2018).
Myronenko, 3D MRI brain tumor segmentation using autoencoder regularization, downloaded from the Internet at: <https://arxiv.org/pdf/1810.11654.pdf> (published Nov. 19, 2018).
Newman et al., Determining cell type abundance and expression from bulk tissues with digital cytometry, Nat. Biotec., 37:773-782 (2019).
Newman et al., Robust enumeration of cell subsets from tissue expression profiles, Nat. Methods, 12:453-457 (2015).
PD-L1 IHC 28-8 pharmDx Guide, 13 pp. Dako North America Inc. (Oct. 2015 edition).
Rajpurkar et al., Deep learning for chest radiograph diagnosis: A retrospective comparison of the CheXNeXt algorithm to practicing radiologists, PLOS Medicine, (2018).
Redox awarded patent for its electronic medical record integration technology, Aug. 29, 2018.
Shah et al., Deep learning assessment of tumor proliferation in breast cancer histological images, Int. Conf. Bioinform. Biomed., (2017).
Stanford ML Group, CheXNeXt: Deep learning for chest radiograph diagnosis, downloaded from the Internet at: <https://stanfordmlgroup.github.io/projects/chexnext/> (Nov. 2018).
Uzzan et al., Microvessel density as a prognostic factor in women with breast cancer, Cancer Res., 64(9):2941-55 (2004).
Wimberly et al., PD-L1 expression correlates with tumor-infiltrating lymphocytes and response to neoadjuvant chemotherapy in breast cancer, Cancer Immun Res., 3(4):326-332 (2014).
Yala et al., A deep learning mammography-based model for improved breast cancer risk prediction, Radiology, 292(1):60-66 (2019).
Young et al., Gene ontology analysis for RNA-seq: accounting for selection bias, Genome. Biol., 11:R14 (2010).
Zhang et al., Aspect-augmented adversarial network for domain adaptation, Transactions of the Association for Computational Linguistics, 5:515-528 (2017).

(56) References Cited

OTHER PUBLICATIONS

Zhu et al., Deciphering genomic underpinnings of quantitative MRI-based radiomic phenotypes of invasive breast carcinoma, Sci. Rep., 5, Article No. 17787 (2015).
Pellegrino et al., "Controversies in oncology: are genomic tests quantifying homologous recombination repair deficiency (HRD) useful for treatment decision making?," ESMO Open 4(2) (2018).
Ulyanov et al., Instance normalization: the missing ingredient for fast stylization, arXiv:1607.08022, 1-6 (2017).
Echle et al., Clinical-grade detection of microsatellite instability in colorectal tumors by deep learning, Gastroenterology, 159(4):1406-16 (2020).
Final Office Action, U.S. Appl. No. 17/139,784, dated Aug. 20, 2021, 23 pages.
Saillard et al., Self supervised learning improves dMMR/MSI detection from histology slides across multiple cancers, Poster and oral presentation at the MICCAI 2021 COMPAY Workshop (submitted Jul. 19, 2021).
Zoltan et al., Correlation between microsatellite instability and morphology in colorectal cancer, Magy Onkol., 54(2):169-78 (2010).
Madabhushi et al., Image analysis and machine learning in digital pathology: Challenges and opportunities, Med. Image Anal., 33:170-175 (2016).
McLaughlin et al., Quantitative assessment of the heterogeneity of PD-L1 expression in non-small-cell lung cancer, JAMA Oncol. American Medical Association, 2:46-54 (2016).
Meng et al., Predictive biomarkers in PD-1/PD-L1 checkpoint blockade immunotherapy, Cancer Treat. Rev., 41:868-76 (2015).
Nalisnik et al., Interactive phenotyping of large-scale histology imaging data with HistomicsML, Sci. Rep., 1-12 (2017).
Nawaz et al., Beyond immune density: critical role of spatial heterogeneity in oestrogen receptor-negative breast cancer, doi:10.1038/modpathol., 37 (2015).
O'Rourke et al., Is concurrent chemoradiation the standard of care for locally advanced non-small cell lung cancer?, A review of guidelines and evidence, Clin. Oncol., 22:347-55 (2010).
OpenSeadragon API: Getting Started, available online at <https://openseadragon.github.io/docs/>, (3) 2020.
Orange et al., Identification of three rheumatoid arthritis disease subtypes by machine learning integration of synovial histologic features and RNA sequencing data, Arthritis Rheumatol., 70:690-701 (2018).
Patel et al., Development of immunohistochemistry services for cancer care in western Kenya: Implications for low- and middle-income countries, S. Afr. J. Lab. Clin. Med., 5:187 (2016).
Patel et al., PD-L1 expression as a predictive biomarker in cancer immunotherapy, Mol. Cancer Ther., 14:847-56 (2015).
Popovici et al., Image-based surrogate biomarkers for molecular subtypes of colorectal cancer, Bioinformatics, 33(13):2002-2009 (2017).
Ratcliffe et al., Agreement between programmed cell death ligand-1 diagnostic assays across multiple protein expression cutoffs in non-small cell lung cancer. Clin. Cancer Res., 23:3585-91 (2017).
Rimm et al., A prospective, Multi-institutional, Pathologist-based assessment of 4 immunohistochemistry assays for PD-L1 expression in non-small cell lung cancer, JAMA. Oncol., 3:1051-8 (2017).
Rivenson et al., Deep learning-based virtual histology staining using auto-fluorescence of label-free tissue, Nat. Biomed. Eng., (2019).
Roach et al., Development of a companion diagnostic PD-L1 immunohistochemistry assay for pembrolizumab therapy in non-small-cell lung cancer, Appl. Immunohistochem. Mol. Morphol., 24:392-7 (2016).
Roche Molecular Systems, Inc., NAVIFY Tumor Board, available online at <https://www.navify.com/tumorboard/>, retrieved on Sep. 2020.
Ronneberger et al., U-Net: Convolutional networks for biomedical image segmentation, arXiv:1505.04597 [cs] (2015), https://arxiv.org/abs/1505.04597.
Russakovsky et al., ImageNet large scale visual recognition challenge [Internet], arXiv [cs.CV], (2014), Available from: http://arxiv.org/abs/1409.0575.
Schmidhuber, Deep learning in neural networks: an overview, Neural Netw. Elsevier, 61:85-117 (2015).
Sul et al., FDA approval summary: Pembrolizumab for the treatment of patients with metastatic non-small cell lung cancer whose tumors express programmed death-ligand 1, Oncologist., 21:643-50 (2016).
Sundar et al., Nivolumab in NSCLC: latest evidence and clinical potential, Ther. Adv. Med. Oncol., 7:85-96 (2015).
Teng et al., Classifying cancers based on T-cell infiltration and PD-L1, Cancer Res., 75:2139-45 (2015).
Thrane et al., Spatially resolved transcriptomics enables dissection of genetic heterogeneity in stage III cutaneous malignant melanoma, Cancer Res., 78(20):5970-5979, (2018).
Tizhoosh et al., Artificial intelligence and digital pathology: Challenges and opportunities, J. Pathol. Inform, 9:38 (2018).
U.S. Food & Drug Administration (FDA), KEYTRUDA label [Internet], [cited Last accessed Feb. 12, 2019], Available from: https://www.accessdata.fda.gov/drugsatfda_docs/label/2017/125514s024lbl.pdf#page=46.
U.S. Food & Drug Administration (FDA), PD-L1 IHC 22C3 pharmDx. Summary of Safety and Effectiveness Data [Internet], [cited Last accessed Feb. 12, 2019], Available from: https://www.accessdata.fda.gov/cdrh_docs/pdf15/P150013S006b.pdf.
University Hospital of Liége and Osimis S.A., REST API of Orthanc, available online at <https://book.orthanc-server.com/users/rest.html#>, 17 (2015).
Vassilakopoulou et al., Evaluation of PD-L1 expression and associated tumor-infiltrating lymphocytes in laryngeal squamous cell carcinoma, Clin. Cancer Res., 22:704-13 (2016).
Velcheti et al., Programmed death ligand-1 expression in non-small cell lung cancer, Lab. Invest., 94:107-16 (2014).
Wang et al., Deep learning assessment of tumor proliferation in breast cancer histological images, IEEE Int. Conf. Bioinfo. Biomed. (BIBM), 600-603 (2017).
Wimberly et al., PD-L1 expression correlates with tumor-infiltrating lymphocytes and response to neoadjuvant chemotherapy in breast cancer, Cancer Immunol. Res., 3(4):326-332 (2015).
Xu et al., A deep convolutional neural network for segmenting and classifying epithelial and stromal regions in histopathological images, Neurocomputing, 191:214-223 (2016).
Yi et al., Microvessel prediction in H&E stained pathology images using fully convolutional neural networks, BMC Bioinformatics, 19:64 (2018).
Yuan et al. Quantitative image analysis of cellular heterogeneity in breast tumors complements genomic profiling, Science Translational Medicine, 4(157):157ra143 (2012).
Yuan et al., Supplementary materials for quantitative image analysis of cellular heterogeneity in breast tumors complements genomic profiling, (2012), doi:10.1126/scitranslmed.3004330.
Zhu et al., Deciphering genomic underpinnings of quantitative MRI-based radiomic phenotypes of invasive breast carcinoma, Sci. Rep., 5:17787 (2016).
Tsujikawa et al., "Quantitative Multiplex Immunohistochemistry Reveals Myeloid-Inflamed Tumor-Immune Complexity Associated with Poor Prognosis." Cell Reports 19:203-217 (2017).
Tzeng et al,. "Adversarial Discriminative Domain Adaptation," Proceedings of the IEEE Conference on Computer Vision and Pattern Recognition 7167-7176 (2017).
U.S. Food & Drug Administration, Letter of Review of FoundationOne CDx (Trademark), 5 pp. (Nov. 30, 2017).
Umar et al., "Revised Bethesda Guidelines for Hereditary Nonpolyposis Colorectal Cancer (Lynch syndrome) and Microsatellite Instability," Journal of the National Cancer Institute 96:261-268 (2004).
Vasconcelos et al., "Increasing Deep Learning Melanoma Classification by Classical and Expert Knowledge Based Image Transforms," CoRR (2017).
Vilar et al., "Microsatellite instability in colorectal cancer-the stable evidence," Nature Reviews Clinical Oncology 7:153-162 (2010).

(56) References Cited

OTHER PUBLICATIONS

Wang et al., "Comprehensive analysis of lung cancer pathology images to discover tumor shape and boundary features that predict survival outcome," Scientific Reports 8:10393, 9 pages (2018).
Weinstein et al., "The Cancer Genome Atlas Pan-Cancer Analysis Project," Nature Genetics 45:1113-1120 (2013).
Yu et al., "Predicting non-small cell lung cancer prognosis by fully automated microscopic pathology image features," Nature Communications 7:12474, 10 pages (2016).
Zhang et al., Adversarial deep learning for microsatellite instability prediction from histopathology, slides, First Conference on Medical Imaging with Deep Learning (MIDL, 2018), Amsterdam, The Netherlands.
International Application No. PCT/US2020/024748, International Search Report and Written Opinion, dated Aug. 3, 2020.
International Application No. PCT/US2020/024748, Invitation to Pay Additional Fees, dated Jun. 10, 2020.
Abdel-Rahman, Correlation between PD-L1 expression and outcome of NSCLC patients treated with anti-PD-1/PD-L1 agents: A meta-analysis, Crit. Rev. Oncol. Hematol., 101:75-85 (2016).
Aderi, Pathology services in developing countries—the West African experience, Arch. Pathol. Lab. Med., 135:183-6 (2011).
Aerts et al., Decoding tumour phenotype by noninvasive imaging using a quantitative radiomics approach, Nat. Commun., 5:4006 (2014).
Ash et al., Joint analysis of gene expression levels and histological images identifies genes associated with tissue morphology, 1-28 (2018).
Baas et al., Relationship between level of PD-L1 expression and outcomes in the KEYNOTE-010 study of pembrolizumab vs docetaxel for previously treated, PD-L1-Positive NSCLC., J. Clin. Orthod. American Society of Clinical Oncology, 34:9015-9015 (2016).
Bankhead et al., QuPath: Open source software for digital pathology image analysis, Sci. Rep., 7:16878 (2017).
Bergado et al., Recurrent multiresolution convolutional networks for vhr image classification, (2018), <Downloaded from the Internet https://arxiv.org/pdf/1806.05793.pdf > <Downloaded on: Mar. 15, 2020> < DOI: 10.1109/TGRS.2018.2837357 > entire document, especially.
Borghaei et al., Nivolumab versus docetaxel in advanced nonsquamous non-small-cell lung cancer, N. Engl. J. Med., 373:1627-39 (2015).
Brahmer et al., Safety and activity of anti-PD-L1 antibody in patients with advanced cancer, N. Engl. J. Med., 366:2455-65 (2012).
Bray et al., Global cancer statistics 2018: GLOBOCAN estimates of incidence and mortality worldwide for 36 cancers in 185 countries, CA Cancer J. Clin., 68:394-424 (2018).
Bunescu et al., Multiple instance learning for sparse positive bags, Proceedings of the 24th Annual Intl. Conf. on Machine Learning (ICML-2007).
Buttner et al., Programmed death-ligand 1 immunohistochemistry testing: A review of analytical assays and clinical implementation in non-small-cell lung cancer, J. Clin. Oncol., 35:3867-76 (2017).
Bychkov et al., Deep learning for tissue microarray image-based outcome prediction in patients with colorectal cancer, Proc. of SPIE, 9791:979115 (2016).
Campanella et al., Clinical-grade computational pathology using weakly supervised deep learning on whole slide images, Nature Medicine, 25:1301-1309 (2019).
Cardiff et al., Manual hematoxylin and eosin staining of mouse tissue sections, Cold Spring Harb Protoc., 655-8 (2014).
Chang, Chemotherapy, chemoresistance and the changing treatment landscape for NSCLC, Lung Cancer, 71:3-10 (2011).
Clunie, HIMA_2017_DICOMWSI_Clunie [PowerPoint slides]. Retrieved from https://www.dclunie.com/papers/HIMA_2017_DICOMWSI_Clunie.pdf, (2017).
Cooper et al., PanCancer insights from the cancer genome atlas: the pathologist's perspective, J. Pathol., 244:512-524(2018).

Couture et al., Image analysis with deep learning to predict breast cancer grade, ER status, histologic subtype, and intrinsic subtype, NPJ. Breast Cancer, 4:30 (2018).
D'Incecco et al., PD-1 and PD-L1 expression in molecularly selected non-small-cell lung cancer patients, Br. J. Cancer, 112:95-102 (2015).
Denkert et al., Standardized evaluation of tumor-infiltrating lymphocytes in breast cancer: results of the ring studies of the international immuno-oncology biomarker working group, Mod. Pathol., 29:1155-64 (2016).
Ertosun et al., Automated grading of gliomas using deep learning in digital pathology images: A modular approach with ensemble of convolutional neural networks, AMIA. Annu. Symp. Proceedings AMIA. Symp., 1899-908 (2015).
Feldman et al., Tissue processing and hematoxylin and eosin staining, Methods Mol. Biol., 1180:31-43 (2014).
Garg et al., Patterns of locoregional failure in stage III non-small cell lung cancer treated with definitive chemoradiation therapy, Pract. Radiat. Oncol., 4:342-8 (2014).
Gertych et al., Convolutional neural networks can accurately distinguish four histologic growth patterns of lung adenocarcinoma in digital slides, Sci. Rep., nature.com, 9:1483 (2019).
GitHub, "HistomicsTK", available online at <https://github.com/DigitalSlideArchive/HistomicsTK>, retrieved on Apr. 17, 2020, 3 pages.
Grossmann et al., Defining the biological basis of radiomic phenotypes in lung cancer, Elife, 6:e23421 (2017).
Heindl et al., Microenvironmental niche divergence shapes BRCA1-dysregulated ovarian cancer morphological plasticity, Nat. Commun., (2018), doi:10.1038/s41467-018-06130-3.
Herbst et al., Pembrolizumab versus docetaxel for previously treated, PD-L1-positive, advanced non-small-cell lung cancer (KEYNOTE-010): a randomised controlled trial Lancet, 387:1540-50 (2016).
Herbst et al., Predictive correlates of response to the anti-PD-L1 antibody MPDL3280A in cancer patients, Nature, 515:563-7 (2014).
Ilse et al., Attention-based deep multiple instance learning, Proceedings of the 35th International Conference on Machine Learning, PMLR 80:2127-2136 (2018).
Ing et al., A novel machine learning approach reveals latent vascular phenotypes predictive of renal cancer outcome, Sci. Rep., 7:13190 (2017).
International Application No. PCT/US2019/069164, International Search Report and Written Opinion, dated Apr. 9, 2020.
Ioffe et al., Batch normalization: Accelerating deep network training by reducing internal covariate shift [Internet], arXiv [cs.LG], (2015), Available from: http://arxiv.org/abs/1502.03167.
Janowczyk et al., Deep learning for digital pathology imageanalysis: A comprehensive tutorial with selected use cases, J. Pathol. Inform., 7:29 (2016).
Janzic et al., PD-L1 Expression in Squamous-cell Carcinoma and Adenocarcinoma of the lung, Radiol. Oncol., 51:357-62 (2017).
Kapil et al., Deep semi supervised generative learning for automated PD-L1 tumor cell scoring on NSCLC tissue needle biopsies, 1-10 (2018).
Kazandjian et al., FDA approval summary: Nivolumab for the treatment of metastatic non-small cell lung cancer with progression on or after platinum-based chemotherapy, Oncologist., 21:634-42 (2016).
Kerr et al., Programmed death ligand-1 immunohistochemistry: Friend or foe?, Arch. Pathol. Lab. Med., 140:326-31 (2016).
Kitano et al., Tumour-infiltrating lymphocytes are correlated with higher expression levels of PD-1 and PD-L1 in early breast cancer, ESMO Open, 2:e000150 (2017).
Komura et al., Machine learning methods for histopathological image analysis, Comput. Struct. Biotechnol. J., 16:34-42 (2018).
Kristensen et al., Principles and methods of integrative genomic analyses in cancer, Nat. Rev., 14:299-313 (2014).
Krupinski et al., A new software platform to improve multidisciplinary tumor board workflows and user satisfaction: A pilot study, J. Pathol. Inform., 9:26 (2018).
Lan et al., Quantitative histology analysis of the ovarian tumour microenvironment, Sci. Rep., 5:16317 (2015).

(56) References Cited

OTHER PUBLICATIONS

Leek et al., Association of macrophage infiltration with angiogenesis and prognosis in invasive breast carcinoma, Cancer Res., 56:4625-9 (1996).
Litjens et al., A survey on deep learning in medical image analysis, Med. Image Anal. Elsevier, 42:60-88 (2017).
Litjens et al., Deep learning as a tool for increased accuracy and efficiency of histopathological diagnosis, Sci. Rep. Nature.com, 6:26286 (2016).
Liu et al., Artificial intelligence-based breast cancer nodal metastasis detection, Arch. Pathol. Lab. Med. arpa., 2018-0147-OA (2018). doi:10.5858/arpa.2018-0147-OA.
Long et al., Fully convolutional networks for semantic segmentation, IEEE Transactions on Pattern Analysis and Machine Intelligence, 39:640-651 (2017), https://ieeexplore.ieee.org/document/7298965.
Luo et al., Comprehensive computational pathological image analysis predicts lung cancer prognosis, J. Thorac. Oncol., 12:501-509 (2017).
Ahn et al., DeMix: deconvolution for mixed cancer transcriptomes using raw measured data, Bioinformatics, 29(15):1865-1871 (2013).
Bellevicine et al., How to prepare cytological samples for molecular testing, J. Clin. Pathology, 70:819-826 (2017).
Clarke et al., Statistical expression deconvolution from mixed tissue samples, Bioinformatics, 26(8):1043-1049 (2010).
Cobos et al., Computational deconvolution of transcriptomics data from mixed cell populations, Bioinformatics, 1-11 (2018).
Cruz-Roa et al., High-throughput adaptive sampling for whole-slide histopathology image analysis (HASHI) via convolutional neural networks: Application to invasive breast cancer detection, PLoS One, 13(5):e0196828 (2018).
Erkkila et al., Probabilistic analysis of gene expression measurements from heterogeneous tissues, Bioinformatics, 26(10):2571-2577 (2010).
Gong et al., DeconRNASeq: a statistical framework for deconvolution of heterogeneous tissue samples based on mRNA-Seq data, Bioinformatics, 29(8):1083-1085 (2013).
International Application No. PCT/US19/69161, International Search Report and Written Opinion, dated Apr. 14, 2020.
Korfiatis et al., Residual deep convolutional neural network predicts MGMT methylation status, J. Digit. Imaging, 30(5):622-628 (2017).
Li et al., Deep learning based radiomics (DLR) and its usage in noninvasive IDH1 prediction for low grade glioma, Sci. Rep., 7(1):5467 (2017).
Li et al., Landscape of tumor-infiltrating T cell repertoire of human cancers, Nat. Genet., 48(7):725-732 (2016).
Non-Final Office Action received for U.S. Appl. No. 17/169,162, dated Jun. 28, 2021, 17 pages.
Quon et al., Computational purification of individual tumor gene expression profiles leads to significant improvements in prognostic prediction, Genome Med., 5(3):29 (2013).
Quon et al., ISOLATE: a computational strategy for identifying the primary origin of cancers using high-throughput sequencing, Bioinformatics, 25(21):2882-2889 (2009).
Shah et al., Deep learning assessment of tumor proliferation in breast cancer histological images, Int. Cont. Bioinform. Biomed., (2017).
Shen-Orr et al., Cell type-specific gene expression differences in complex tissues, Nat. Methods, 7(4):287, pp. 5 (2010).
Wang et al., Transcriptome deconvolution of heterogeneous tumor samples with immune infiltration, iScience, 9:451-460 (2018).
Way et al., Discovering pathway and cell-type signatures in transcriptomic compendia with machine learning, Peer J.Preprints., Sep. 20, 2018, 157-160.
Yang et al., A deep learning approach for tumor tissue image classification, BioMed., (2016).
Yoshihara et al., Inferring tumour purity and stromal and immune cell admixture from expression data, Nat. Comm., 4:2612, pp. 11 (2013).
Zaslavsky et al., Infino: a bayesian hierarchical model improves estimates of immune infiltration into tumor microenvironment, 25 pp., posted Nov. 21, 2017 (downloaded from the Internet at: https://www.biorxiv.org/content/10.1101/221671v1).
European Patent Application No. 19804054.5, Extended European Search Report, dated Jan. 12, 2022.
Greenson et al., Pathologic predictors of microsatellite instability in colorectal cancer, Am. J. Surg. Pathol., 126-33, 33(1) (2009).
International Application No. PCT/US2022/011041, International Search Report and Written Opinion, dated Feb. 23, 2022.
Korbar et al., Looking under the hood: Deep neural network visualization to interpret whole-slide image analysis outcomes for colorectal polyps, 2017 IEEE Conference on Computer Vision and Pattern Recognition Workshops, 821-7 (Jul. 21, 2017).
Wetteland et al., A multiscale approach for whole-slide image segmentation of five tissue classes in urothelial carcinoma slides, Technology in Cancer Research & Treatment, 19:1-15 (2020).
Dimitrakopoulou et al., Deblender: a semi-/unsupervised multi-operational computational method for complete deconvolution of expression data from heterogeneous samples, BMC Bioin., 19(1):1-17 (2018).
European Application No. 19907257.0, Supplementary European search report and Search Opinion, dated Aug. 29, 2022.
European Application No. 19907353.7 Supplementary European search report and Search Opinion, dated Jul. 28, 2022.
European Application No. 20777674.1, European Search Report and Opinion, dated Nov. 15, 2022.
Klauschen, F., et al., Scoring of tumor-infiltrating lymphocytes: From visual estimation to machine learning, Seminars in Cancer Biology, 52:151-157 (2018).
Li et al., Gland segmentation in colon histology images using hand-crafted features and convolutional neural networks, 2016 IEEE Int. Symp. Biom. Imag., 1405-1408 (2016).
Xing et al., Deep learning in microscopy image analysis: a survey, IEEE, Trans. Neur. Netw. Learn. Sys!., 29(10):4550-4568 (2018).

\* cited by examiner

GENERALIZABLE AND INTERPRETABLE DEEP LEARNING FRAMEWORK FOR PREDICTING MSI FROM HISTOPATHOLOGY SLIDE IMAGES

CROSS-REFERENCE TO RELATED APPLICATIONS

The present application claims the benefit of U.S. Provisional Application No. 62/671,300, entitled "Generalizable and Interpretable Deep Learning Framework for Predicting MSI from Histopathology Slide Images, filed on May 14, 2018, which is hereby incorporated by reference herein in its entirety.

FIELD OF THE INVENTION

The present disclosure relates to examining microsatellite instability of a sample and, more particularly, to predicting microsatellite instability from histopathology slide images.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Cancer immunotherapies, such as checkpoint blockade therapy and cancer vaccines, have shown striking clinical success in a wide range of malignancies, particularly those with melanoma, lung, bladder, and colorectal cancers. Recently, the Food & Drug Administration (FDA) announced approval of checkpoint blockade to treat cancers with a specific genomic indication known as microsatellite instability (MSI). For the first time, the FDA has recognized the use of a genomic profile, rather than an anatomical tumor type (e.g., endometrial or gastric tumor types), as a criterion in the drug approval process. There are currently only a handful of FDA approved checkpoint blockade antibodies. Based on results from ongoing clinical trials, checkpoint blockade antibodies appear poised to make a major impact in tumors with microsatellite instability. However, challenges in the assessment and use of MSI are considerable.

Despite the promise of MSI as a genomic indication for driving treatment, several challenges remain. In particular, conventional techniques for diagnostic testing of MSI require specialized pathology labs having sophisticated equipment (e.g., clinical next-generation sequencing) and extensive optimization of protocols for specific assays (e.g., defective mismatch pair (dMMR) immunohistochemistry (IHC) or microsatellite instability (MSI) PCR). Such techniques limit widespread MSI testing.

There is a need for new easily accessible techniques of diagnostic testing for MSI and for assessing MSI in an efficient manner, across population groups, for producing better optimized drug treatment recommendations and protocols.

SUMMARY OF THE INVENTION

The present application presents a deep learning framework to directly learn from histopathology slides and predict MSI status. We describe frameworks that combine adversarial-based mechanism for deep learning on histopathology images. These frameworks improve model generalizability to tumor types including those not observed in training. Indeed, these frameworks improve model generalizability to compensate for many different types of biases, not observed in training, including data from multiple clinical sources, as well as data from different tissue types. Furthermore, these frameworks can also perform guided backpropagation on histopathology slides to facilitate visual interpretation of our classification model. We systematically evaluate our framework across different cancer types and demonstrate that our framework offers a novel solution to developing generalizable and interpretable deep learning models for digital pathology.

In accordance with an example, a computing device configured to generate an image-based microsatellite instability (MSI) prediction model, the computing device comprising one or more processors configured to: obtain a set of stained histopathology images from one or more image sources, the set of stained histopathology images having a first cancer type-specific bias or data source-specific bias; store in a database, using the one or more computing devices, an association between the histopathology slide images and the plurality of MSI classification labels; apply a statistical model to analyze the set of stained histopathology images and generate an initial baseline MSI prediction model, the initial baseline MSI prediction model exhibiting cancer type-specific bias or data source-specific bias; apply an adversarial training to the baseline MSI prediction model; and generate an adversarial trained MSI prediction model configured to predict MSI status for subsequent stained histopathology images, the adversarial trained MSI prediction model characterized by a reduction in cancer type-specific bias or data source-specific bias in comparison to the initial baseline MSI prediction status model.

In accordance with another example, a computer-implemented method to generate an image-based microsatellite instability (MSI) prediction model, the method comprising: obtaining a set of stained histopathology images from one or more image sources, the set of stained histopathology images having a first cancer type-specific bias or data source-specific bias; storing in a database, using the one or more computing devices, an association between the histopathology slide images and the plurality of MSI classification labels; applying a statistical model to analyze the set of stained histopathology images and generating an initial baseline MSI prediction model, the initial baseline MSI prediction model exhibiting cancer type-specific bias or data source-specific bias; applying an adversarial training to the initial baseline MSI prediction model; and generating an adversarial trained MSI prediction model configured to predict MSI status for subsequent stained histopathology images, the adversarial trained MSI prediction model characterized by a reduction in cancer type-specific bias or data source-specific bias in comparison to the initial baseline MSI prediction status model.

In some examples, the statistical model is a Neural Network, Support Vector Machine (SVM), or other machine learning process. In some examples, the statistical model is a deep learning classifier.

In some examples, one or more processors are configured to: obtain at least one of the subsequent stained histopathology images; apply the adversarial trained MSI prediction model to the at least one subsequent stained histopathology image and predict MSI status; examine the at least one subsequent stained histopathology image and identify patches of associated with the MSI status; and generate a guided backpropagation histopathology image from the at least one subsequent stained histopathology image, the guided backpropagation histopathology image depicting the patches associated with the MSI status.

In some examples, patches comprise pixels or groups of pixels. In some examples, those patches correspond to topology and/or morphology of pixels or groups of pixels.

In some examples, subsequent stained histopathology images are examined and patches associated with the MSI status are identified using a gradient-weighted class activation map.

In accordance with another example, a computing device configured to generate an image-based microsatellite instability (MSI) prediction model, the computing device comprising one or more processors configured to: obtain a set of stained histopathology images from one or more image sources, the set of stained histopathology images having a first cancer type-specific bias or data source-specific bias; store in a database, using the one or more computing devices, an association between the histopathology slide images and the plurality of MSI classification labels; and apply a statistical model to analyze the set of stained histopathology images and generate a trained MSI prediction model configured to predict MSI status for subsequent stained histopathology images.

BRIEF DESCRIPTION OF THE DRAWINGS

The figures described below depict various aspects of the system and methods disclosed herein. It should be understood that each figure depicts an example of aspects of the present systems and methods.

DETAILED DESCRIPTION

Figure 1:
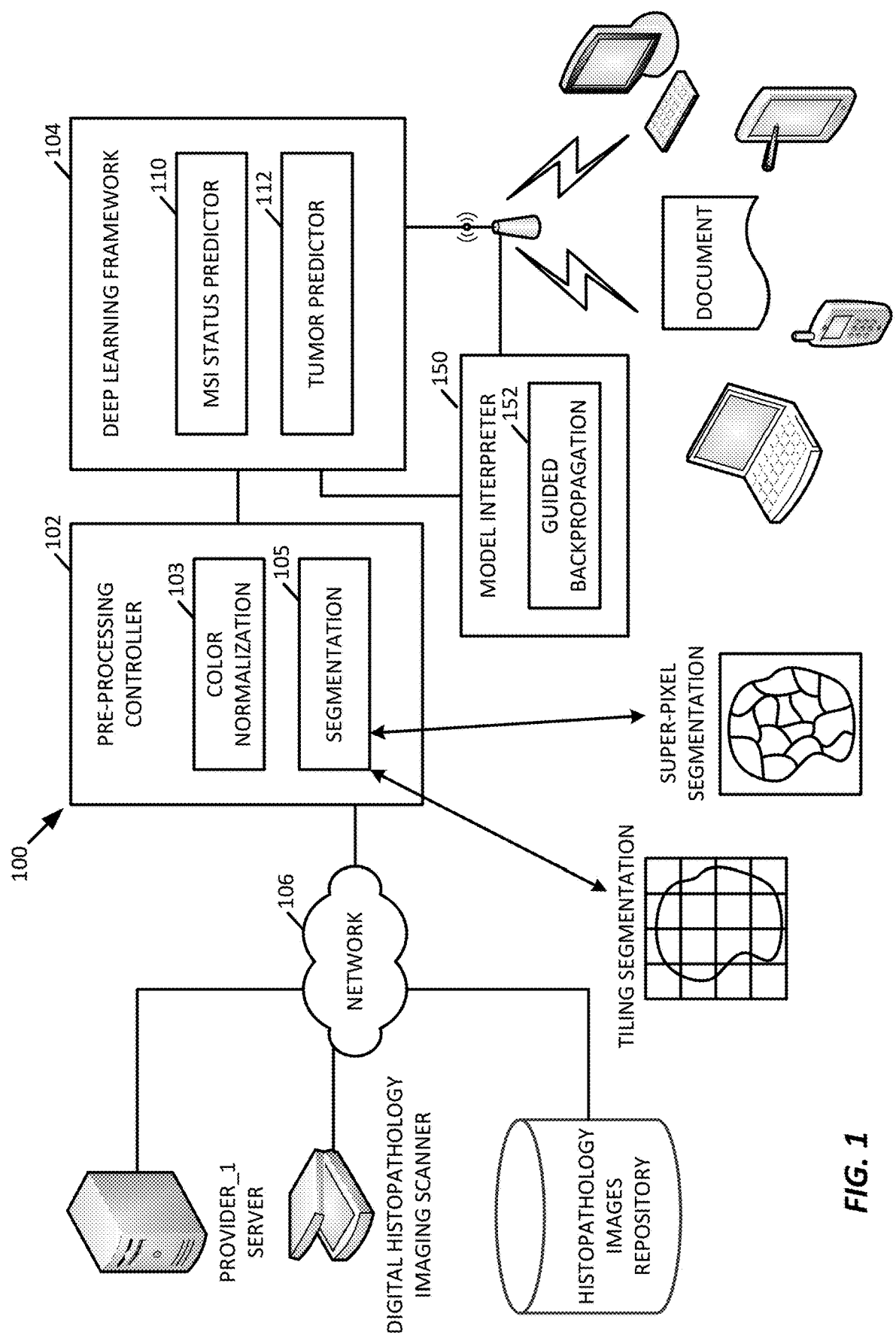
FIG. 1 is a schematic illustration of an example deep learning microsatellite instability (MSI) predictor system for predicting MSI directly from medical images, such as histopathology images.

The present disclosure is generally related to techniques for providing a generalizable and interpretable deep learning model for predicting microsatellite instability (MSI) directly from medical images, including routine histopathology images. These techniques provide an entirely new and automated modality for MSI testing and MSI status prediction via learned processes. Moreover, these techniques may be implemented in different frameworks, in what we call non-adversarial frameworks and adversarial frameworks, where the former allows for a cancer type-specific bias or data source-specific bias in a trained deep learning model, and the where the later effectively eliminates/reduces cancer type-specific bias and/or data source-specific bias in a trained deep learning model.

In some examples, the present techniques provide a system for analyzing medical images to accurately predict MSI status for a patient. Those medical images are histopathology slide images, which under the present techniques, are determined to contain sufficient latent information for accurate prediction of MSI status.

The tumor microenvironment is extremely complex and heterogeneous, containing a diverse mixture of tumor, stromal, and immune cells. Tumors use immune checkpoints in the body to shield themselves from attack by the immune system. These immune checkpoints can be stimulatory or inhibitory, and checkpoint blockade therapies are being developed to stop this tumor shielding process. The success of checkpoint blockade treatment is based, in part, on the activation of infiltrating immune cells present in the tumor microenvironment. Information about infiltrating immune cells in histopathology slides is normally only accessible by overlaying additional multiplexed immunofluorescence or immunohistochemistry stains. But the we reasoned that embedded in common microscopic histopathology slides is fine-grained information about the topology, morphology, and population structure of cells within the tumor-immune microenvironment. We therefore developed frameworks designed to analyze these topology structures, morphology structures, and population structures of the cells in the microenvironment, for predicting MSI status for a patient.

In some examples, the present techniques include processes for training a deep neural network to assess medical images and predict MSI status. Generally speaking, deep neural networks provide a robust and durable approach to solving complex image analysis tasks, especially when specific visual features may be difficult to articulate a priori. The present techniques exploit deep neural networks to assess medical images, e.g., histopathology slide images, by analyzing extremely nuanced and fine-grained nature of features that distinguish certain pathological classifications from others, topology features, morphology features, and/or population features. Conventionally, nuanced analysis has been a long-standing challenge, in particular with regard to visual assessment of histopathology images. Medical professionals would manually identify patterns in medical images, and even then it is virtually impossible for medical professionals to identify features of topology and complex morphology. With the present techniques, however, deep neural networks have been used to learn fine-grained features directly from raw images in a supervised machine learning setting.

The present techniques predict MSI from histopathology slide images by classifying images based on a plurality of MSI states. MSI is a type of genomic instability that results from defects in DNA mismatch repair and can occur in a range of cancers. This mismatch repair defect results in a hyper-mutated phenotype where alterations in the repetitive microsatellite regions accumulate. Microsatellite instability may result in colon cancer, gastric cancer, endometrium cancer, ovarian cancer, hepatobiliary tract cancer, urinary tract cancer, brain cancer, and skin cancers, while MSI is believed to be most prevalent in colon cancers.

In examples herein, the present techniques predict MSI states based on three MSI states: Microsatellite-High (MSI-H), Microsatellite Stable (MSS), and Microsatellite-Low (MSI-L). MSI-H tumors are those in which the number of repeats present in microsatellite regions differ significantly from the number of repeats that are in the DNA of a benign cell. By way of example, in clinical MSI PCR testing, tumors with length differences in 2 or more of the 5-microsatellite markers on the Bethesda panel unstable are considered MSI-H. MSS tumors are tumors that have no functional defects in DNA mismatch repair and have no significant differences between tumor and normal in microsatellite regions. MSI-L tumors are tumors with an intermediate phenotype that cannot be clearly classified as MSI-H or MSS based on cut-offs used to define those two categories. Overall, MSI is observed in 15% of sporadic colorectal tumors worldwide and has been reported in other cancer types including uterine and gastric cancers.

In some examples, the present techniques include training a neural network to predict MSI status of histopathology slide images based on a training image sets that include cancer-type specific biases and/or data source-specific bias. For cancer-type specific bias, for example, because MSI is most prevalent in colon cancer, the training images are colon cancer dominant, which results in a trained deep learning model that is colon cancer sensitive. The trained MSI predictor model in such examples can predict MSI status for images of other cancer types (e.g., Microsatellite gastric cancer, endometrium cancer, ovarian cancer, hepatobiliary tract cancer, urinary tract cancer, brain cancer, and skin cancers), but with lower accuracy, in general, compared to MSI prediction for colon cancer. For data source-specific bias, the trained MSI predictor model can predict MSI status for images collected from different sources, for example, sources that generate different imaging data, such as may result from differences in biospecimen fixation, embedding, and staining protocols, and distinct pathology imaging instruments and settings associated with the data source. Such implementations are termed non-adversarial herein.

In some examples, however, the present techniques have been implemented to include adversarial deep learning techniques that, while trained with the same cancer-type specific biases and/or data source-specific bias, can predict MSI status across the different cancer types or data source-specific biases without any (or with a lesser degree) of bias. Conventional deep learning techniques suffer from selection bias, where a network is trained based on a set of training images that are too similar to one another. The result is a deep learning process trained biased toward certain outcomes. Selection bias, we found, is a particular problem in cancer detection in medical images, especially when trying to predict MSI. The selection bias for MSI is particularly acute, we have found, because the overwhelming majority of medical images exhibiting MSI states correlated to a cancer are medical images of colon cancer. Such bias affects various non-adversarial implementations of the present techniques, for example. Yet, the present techniques include an adversarial deep learning process that determines MSI predictor status in a cancer agnostic manner, thereby allowing for accurate MSI status for different types of cancers, even when the system is trained by a training image set that has a cancer type-specific bias, such as a colon cancer dominant training image set, or a data source-specific bias. With the adversarial trained MSI predictor models herein, MSI prediction status is not anatomically restricted to a specific cancer type (or cancer types), and the MSI predictor model is able to predict MSI status across a range of cancer types including, including for cancer types not actually observed in training. That applies to different data source-specific biases, as well.

To implement adversarial deep learning, in some examples, the present techniques deploy a framework having two classifiers, one for predicting MSI status and the other predicting tumor type, cancer type, or data source-specific bias. To retain higher accuracy in MSI prediction, the frameworks may be designed to predict MSI status with a higher degree of accuracy, while allowing for predicting tumor type with a lower degree of accuracy, as any model that successfully predicts tumor type is likely learning features of the anatomical location rather than generalizable, biological features of MSI.

Figure 3:
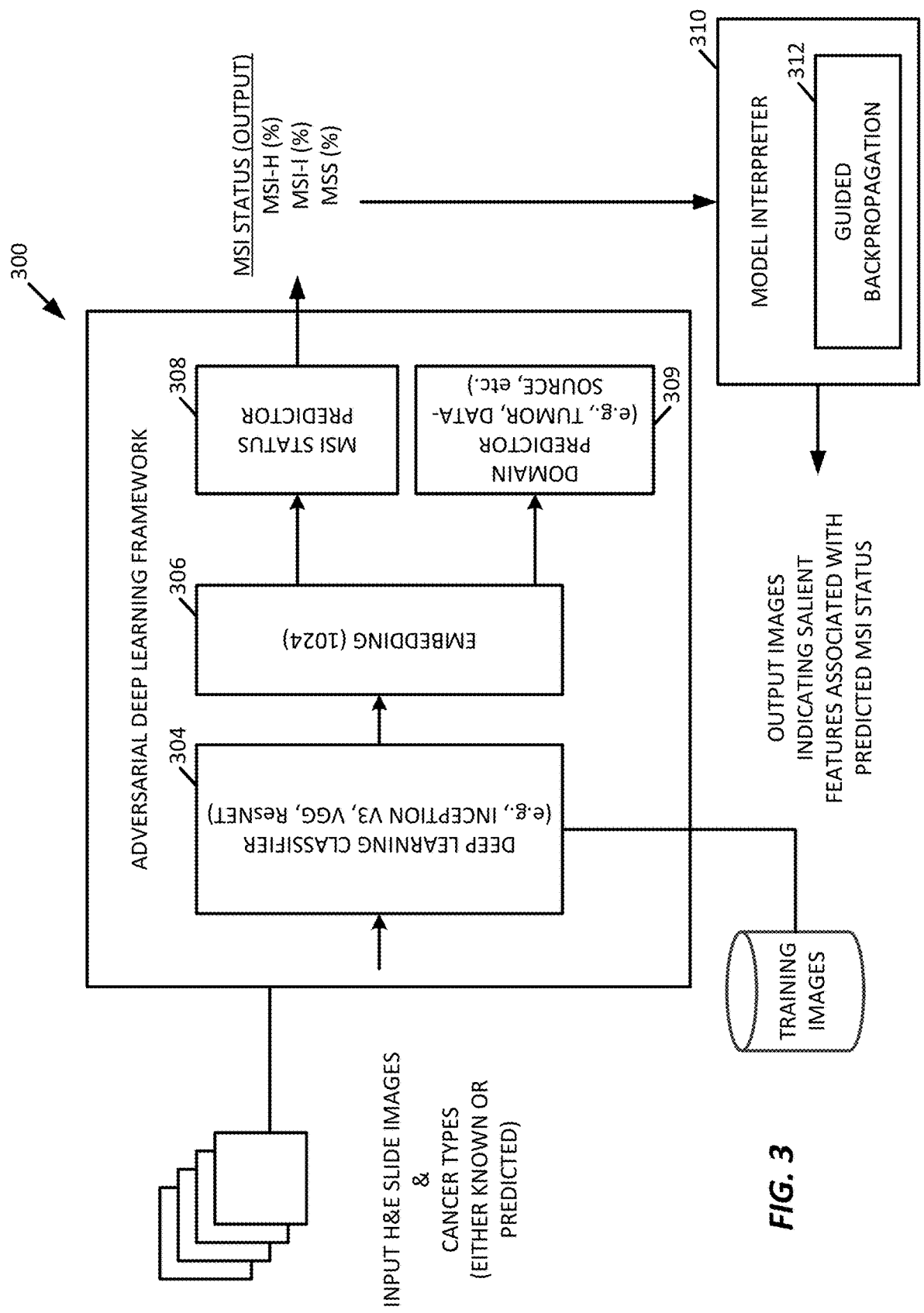
FIG. 3 is a schematic illustration of a deep learning framework for MSI predictor status, as may be implemented in the system of FIG. 2, in accordance with another example. The framework includes an MSI predictor (classifier) model and an adversarial trained tumor type (classifier) model.

As discussed further in reference to FIG. 3, the two classification outcomes of adversarial deep learning may be accomplished, in some examples, by orienting a tumor type classifier or data source type classifier into an adversarial objective, which causes a high-dimensional image embedding to adjust and satisfy the duelling objectives of high MSI prediction accuracy and sufficient tumor prediction. The framework reduces cancer type-specific biases and/or data source-specific bias (i.e., selection bias) and instead learns invariant high-dimensional representations of MSI.

FIG. 1 illustrates a deep learning MSI predictor processing system 100 for predicting MSI state for a patient via analysis of medical image data. As used herein, the terms MSI state, MSI classification, MSI predictor, and MSI prediction are used interchangeably. Furthermore, the plurality of MSI states refers to states MSI-H, MSI-L, and MSS, in various examples herein. In other examples, the MSI predictor processing system 100 may predict an "Equivocal" MSI state, e.g., an MSI state which is neither MSI-H or MSS.

The deep learning MSI predictor processing system 100 is described, in various examples, as trained using histopathology images, in particular H&E (Haematoxylin and Eosin) stained images.

The deep learning MSI predictor processing system 100 includes an image pre-processing controller 102 and a deep learning framework 104. The pre-processing controller 102 is communicatively coupled to a network 106 to receive medical images (e.g., H&E stained histopathology images) from a variety of different sources (as shown), including (i) medical imaging databases of healthcare providers (Provider_1) such as hospitals, physician groups, labs, etc.; (ii) dedicated digital medical image scanners which may be any suitable optical histopathology slide scanner including 20× and 40× resolution magnification scanners; and (iii) histopathology image repositories, such as the TCGA and NCI Genomic Data Commons. Each of the image sources may present multiple image sources. Further each of these image sources may be considered a different data source, those data sources may be capable of generating and provide imaging data that differs from providers, hospitals, etc. The imaging data between different sources potentially differs in one or more ways, resulting in different data source-specific bias, such as in different dyes, biospecimen fixations, embeddings, staining protocols, and distinct pathology imaging instruments and settings.

Figure 8:
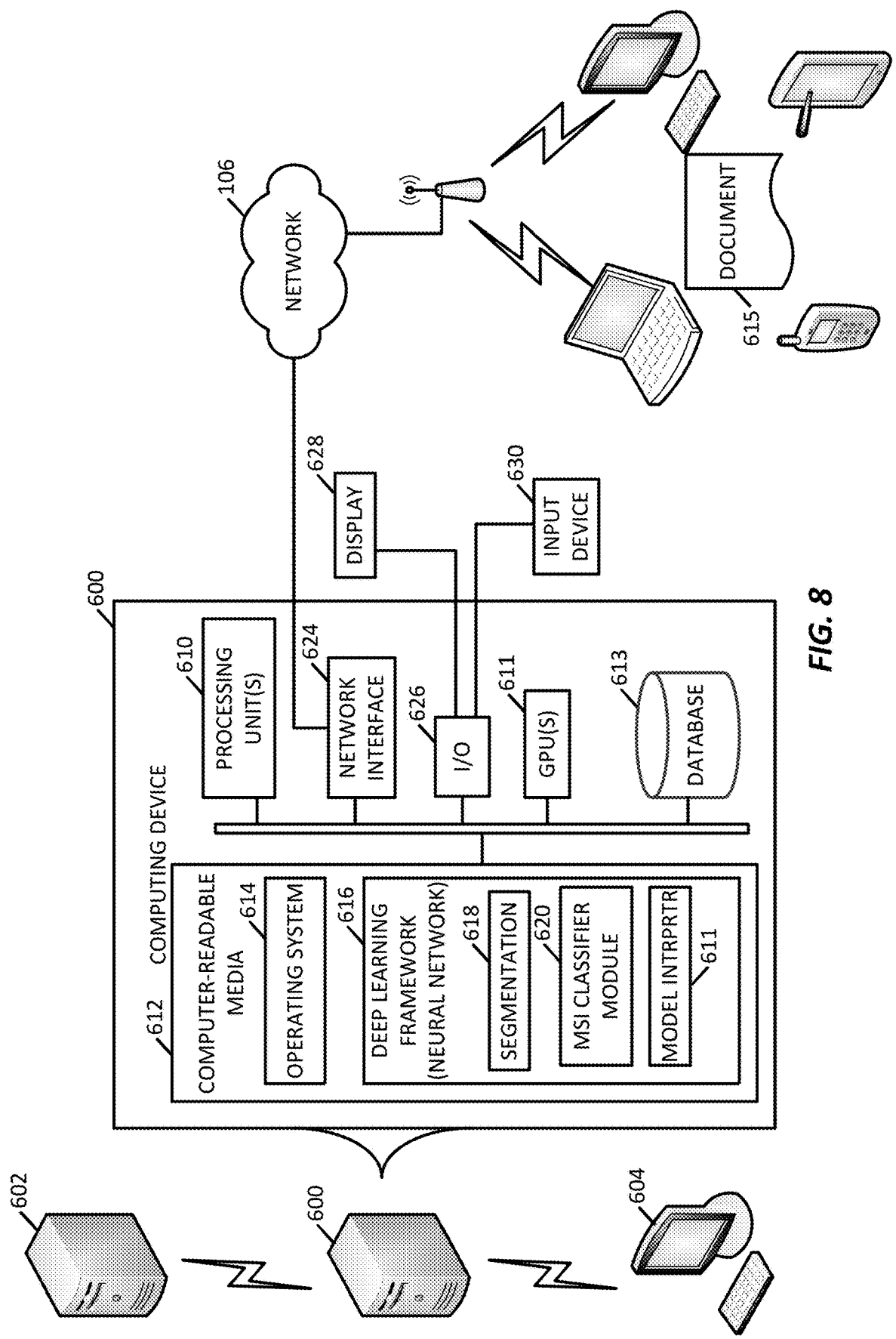
FIG. 8 illustrates an example computing device for implementing the systems of FIGS. 1-3 and the processes of FIGS. 5 and 6, in accordance with an example implementation.

The deep learning MSI predictor processing system 100 may be implemented on a computing device such as a computer, tablet or other mobile computing device, or server. The system 100 may include a number of processors, controllers or other electronic components for processing or facilitating the image capture, generation, or storage and image analysis, as described herein. An example computing device 600 for implementing the MSI predictor processing system 100 is illustrated in FIG. 8. As illustrated, the system 100 may be implemented on the computing device 600 and in particular on one or more processing units 610, which may represent Central Processing Units (CPUs), and/or on one or more Graphical Processing Units (GPUs) 611, including clusters of CPUs and/or GPUs. Features and functions described for the system 100 may be stored on and implemented from one or more non-transitory computer-readable media 612 of the computing device 600. The computer-readable media 612 may include, for example, an operating system 614 and the deep learning framework 616 having elements corresponding to that of MSI predictor processing system 100, including a segmentation processing unit 618, MSI classifier module 620, and a model interpreter 622. More generally, the computer-readable media 612 may store trained deep learning models, executable code, etc. use for implementing the techniques herein. The computer-readable media 612 and the processing unites 610 and GPU(S) 611 may store image data, MSI predictions, MSI label associations, and other data herein in a database 613. The computing device 600 includes a network interface 624 communicatively coupled to the network 106, for communicating to and/or from a portable personal computer, smart phone, electronic document, tablet, and/or desktop personal computer, or other computing devices. The computing device further includes an I/O interface 626 connected to devices, such as digital displays 628, user input devices 630, etc. In some examples, as described herein, the computing device 600 generates MSI prediction as an electronic document 615 that can be accessed and/or shared of the network 106. In the illustrated example, the MSI predictor processing system 100 is implemented on a single server 600. However, the functions of the system 100 may be implemented across distributed devices 600, 602, 604, etc. connected to one another through a communication link. In other examples, functionality of the system 100 may be distributed across any number of devices, including the portable personal computer, smart phone, electronic document, tablet, and desktop personal computer devices shown. The network 106 may be a public network such as the Internet, private network such as research institutions or corporations private network, or any combination thereof. Networks can include, local area network (LAN), wide area network (WAN), cellular, satellite, or other network infrastructure, whether wireless or wired. The network can utilize communications protocols, including packet-based and/or datagram-based protocols such as internet protocol (IP), transmission control protocol (TCP), user datagram protocol (UDP), or other types of protocols. Moreover, the network can include a number of devices that facilitate network communications and/or form a hardware basis for the networks, such as switches, routers, gateways, access points (such as a wireless access point as shown), firewalls, base stations, repeaters, backbone devices, etc.

The computer-readable media may include executable computer-readable code stored thereon for programming a computer (e.g., comprising a processor(s) and GPU(s)) to the techniques herein. Examples of such computer-readable storage media include a hard disk, a CD-ROM, digital versatile disks (DVDs), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. More generally, the processing units of the computing device 600 may represent a CPU-type processing unit, a GPU-type processing unit, a field-programmable gate array (FPGA), another class of digital signal processor (DSP), or other hardware logic components that can be driven by a CPU.

Returning to FIG. 1, the image processing controller 102 may include a pre-processing module that may perform initial processes such as image quality assessment and noise filtering. Because medical images such as H&E stained histopathology images may come from different sources, including different scanners and scanner types, in some examples the controller 102 performs a color normalization 103 to establish a uniform color-scape for the medical images. Additionally, in some examples, the controller 102 performs a tissue segmentation 105 that identifies target tissue within the received medical images and segments that target tissue for analysis by the framework 104. In some examples, the controller 102 deploys a convolutional neural network to perform whole slide image segmentation; although any number of unsupervised or supervised methods of image segmentation may be used.

In some examples, the tissue segmentation process further identifies a patch that will be used for analyzing by the deep learning framework 104 in determining MSI status. Patches may be geometric, e.g., a repeating pattern of square or rectangular pixels defined across each medical image and at a pixel size sufficient to analyze changes in topology and morphology in medical images. Example patch sizes include 1000×1000 pixels, although fewer pixels can be used, such as 900×900, 800×800, 700×700, 600×600, 500×500, and so on, down to at least 100×100, and even further, such as 50×50 depending on the application. In other examples, patch type may be non-geometric, also termed herein a "super pixel," where each patch is allowed to vary in shape, but where the super pixels are generated to include a sufficient threshold of imaging information for topology and morphology analysis.

Figure 2:
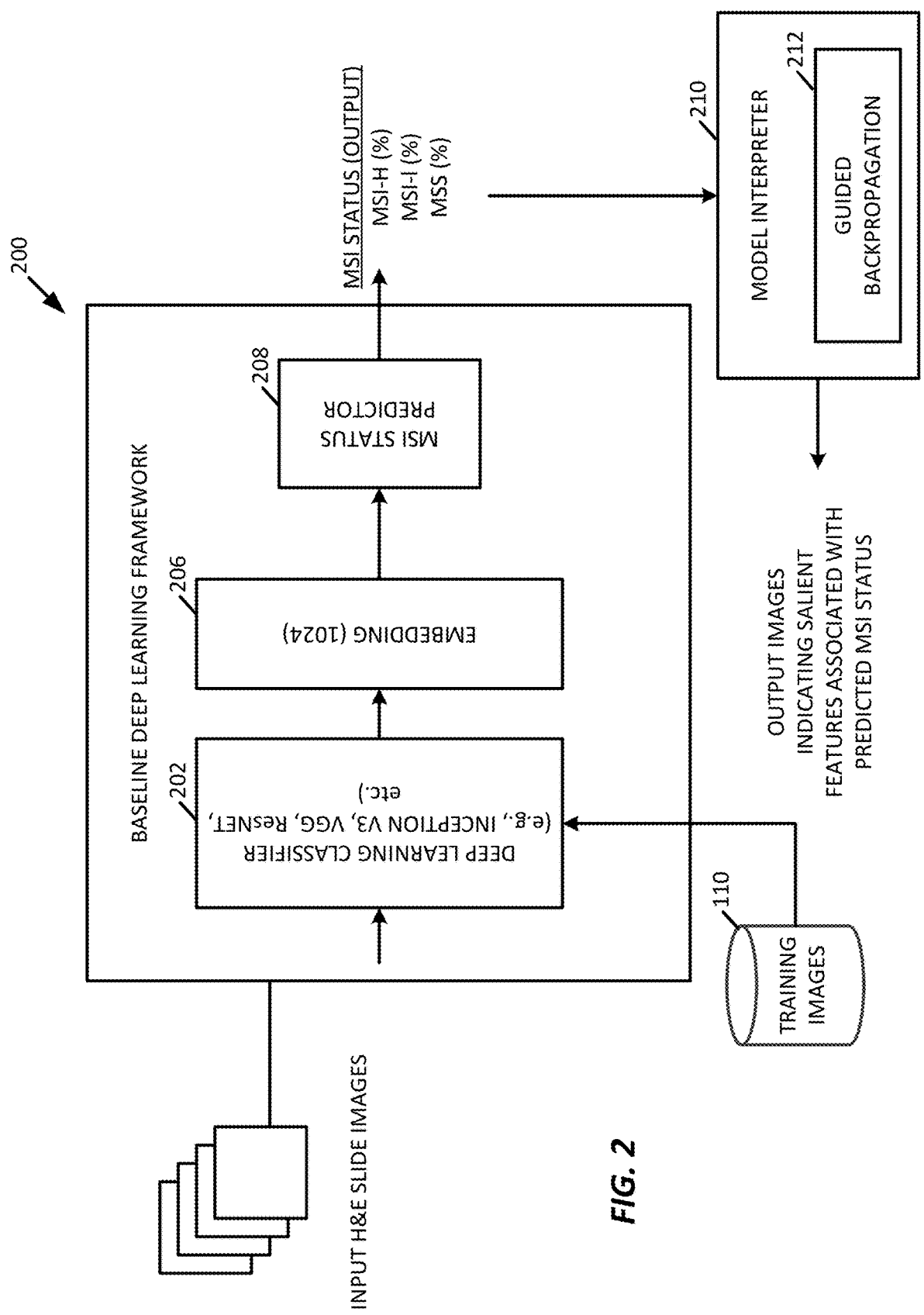
FIG. 2 is a schematic Illustration of a deep learning framework for MSI predictor status, as may be implemented in the system of FIG. 1, in accordance with an example. The framework is a deep learning model without adversarial training.

The deep learning framework 104 may be implemented as a baseline deep learning framework as in framework 200 of FIG. 2. While in other examples, the deep learning framework 104 may be implemented as an adversarial deep learning framework as in the framework 300 of FIG. 3, both discussed further below.

The deep learning framework 104 includes a training state and a testing state. In the training state, the framework 104 generates a deep learning MSI status predictor model 110 and a deep learning tumor predictor model 112 from trained medical images, such as H&E stained histopathology images, and those models are stored in memory. An example method is described in reference to FIG. 5. In a testing state, the trained deep learning MSI status predictor model 110 is applied to received medical images and generates a MSI state prediction for the MSI status values (MSI-H, MSI-L, and MSS). That MSI prediction is a coordinate of probability values (or vectors) for each MSI state [MSI-H, MSI-L, MSS], the sum of which is 1. For example, an MSI state prediction [0.7, 0.2, 0.1] represents a determination that a medical image has a 70% likelihood the patient exhibits MSI-H, a 20% likelihood the patient exhibits MSI-L, and a 10% likelihood the patient exhibits MSS. Corresponding, an MSI state prediction [0.2, 0.2, 0.8] would indicate a 80% likelihood the patient exhibits MSS. The framework 104 may optionally further include a tumor predictor model that is trained to identify a tumor type for each medical image.

FIG. 2 illustrates an example framework 200 implementation of the MSI deep learning framework 104. In the illustrated example, digital H&E slide images are provided (e.g., from the pre-processing controller 102) to the framework 200. A deep learning classifier 202 is provided to identify one or more topology, morphology, and/or population features within the H&E slide images. The deep learning classifier 202 may also use machine learning algorithms capable of being trained by feature selection. In some examples, the deep learning classifier 202 may employ a convolutional neural network for training based on training images obtained from a dataset/database, as shown. Example convolutional neural networks include VGGNet, GoogLeNet, and ResNET. In examples described herein, Inception v3 was used as the deep learning classifier. Further, the illustrated example included a 1024-dimension embedding layer 206 to predict MSI status. Of course, different embedding sizes may be used, such as 1024, 256, . . . , up to 10, depending on the application or alternatively increasing from 2048.

In an example implementation of the framework 200, digital H&E stained histopathology slide images and clinically determined MSI status were obtained from TCGA.

In an example, along with MSI status, 585 colorectal carcinoma (CRC), 556 uterine corpus endometrial carcinoma (UCEC), and 209 stomach adenocarcinoma (STAD) whole-slide histopathology images were obtained from the NCI Genomic Data Commons. In this example, the pre-processing controller 102 was not used, but instead whole-slide images were provided to the deep learning classifier 202. In an example, a segmentation process was still performed and specifically used to clip the H&E stained histopathology slide images into non-overlapping 1000×1000 px sized patches at 20× magnification. Slides with 40× magnification were rescaled to 20× using the Python Imaging Library (version 1.1.7). The segmentation process discarded patches that were >50% empty, and generated nearly 620,833 patches. At runtime patches were resized to input dimensions required for specific deep learning frameworks.

Figure 9A:
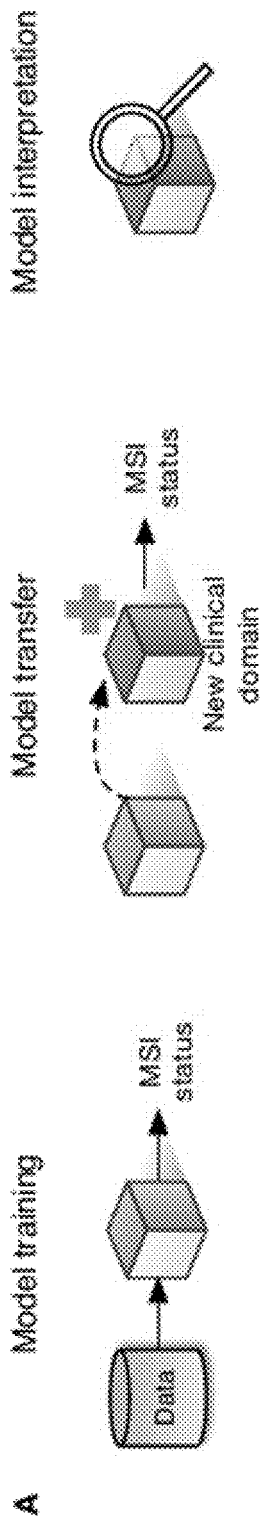
FIG. 9A illustrates an example deep learning model training as may be performed using the framework of FIG. 2, in accordance with an example.
Figure 9B:
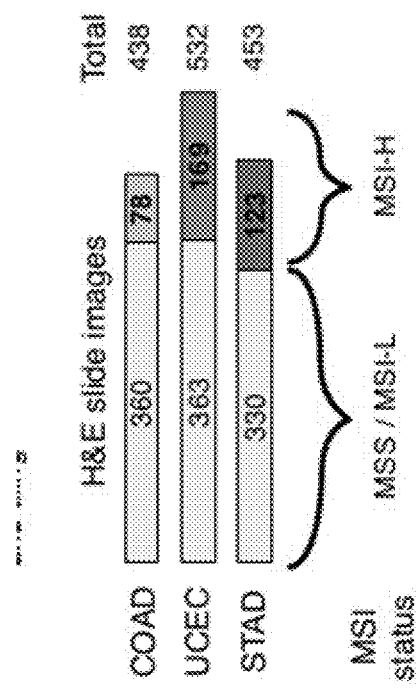
FIG. 9B illustrates the predict MSI status for different cancer type samples, in accordance with the example of FIG. 9A.
Figure 9C:
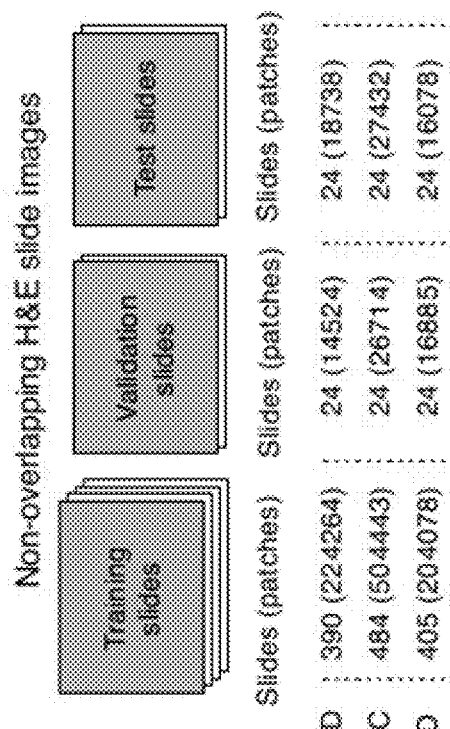
FIG. 9C illustrates the image segmentation and clipping of non-overlapping patches for different sets of image data, training image slides, validation image slides, and testing image slides.
Figure 9D:
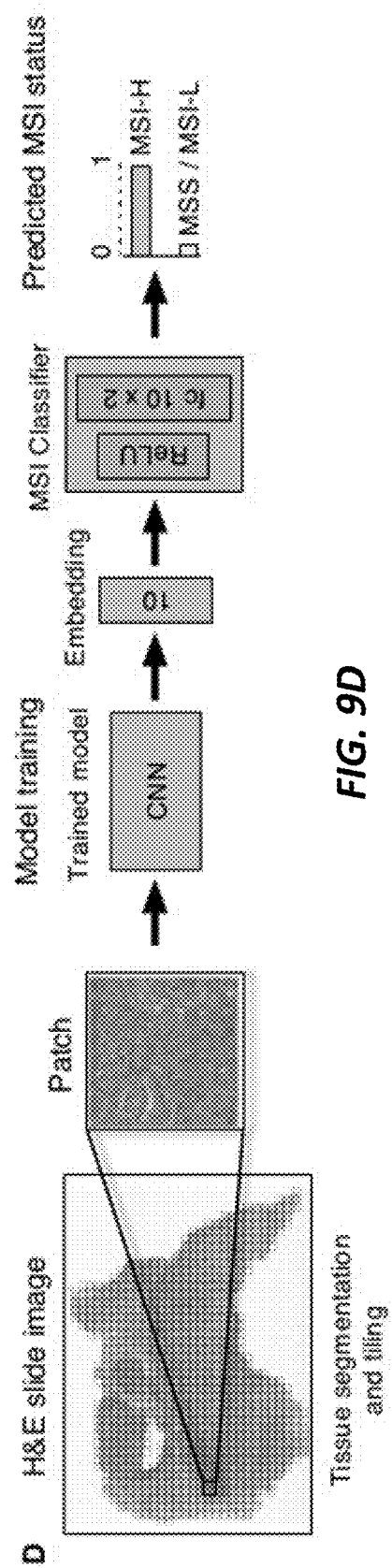
FIG. 9D illustrates an example MSI prediction process performed using the slide patches, in accordance with an example.

In another example, 1423 histopathology slide images from colon adenocarcinoma (COAD; n=438), uterine corpus endometrial carcinoma (UCEC; n=532), and stomach adenocarcinoma (STAD; n=453) from the TCGA Genomic Data Commons were obtained and processed, using the framework 200, illustrated by the process flow of FIGS. 9A and 9B. The proportion of MSI-H samples ranged from 17% to 31% for COAD and UCEC, respectively. For each tissue, all slide images were first divided into three non-overlapping datasets for training, validation, and testing (FIG. 9C), with 8 MSI-H and 16 MSS/MSI-L slides held out for validation and testing. Next, digital tissue segmentation was performed on all histopathology slide images and segmented regions were clipped into non-overlapping 1000×1000 px sized patches at 20× magnification. This resulted in hundreds of thousands of patches (FIG. 9C), with each patch associated with its slide-level MSI status. Finally, in this example, we trained, validated, and tested the framework 200 (e.g., implemented as a deep learning CNN) and predicted MSI status using the slide patches for each cancer type (FIG. 9D). Although the cancer specific model operates at patch-level, we predicted and evaluated accuracy at the slide-level by averaging the MSI prediction probabilities from all patches in a specific slide (slide score).

The framework 200 may perform parameter tuning. For example, in the above example with the CRC samples, CRC patches were randomly assigned to non-overlapping training (80%), test (10%), and validation (10%) image sets. Hyper-parameter settings such as learning rate and batch size were tuned for Inception-v3, VGG19, and ResNet-50 classifier architectures using CRC training and test sets. We used the accuracy on the test set to select the best hyper-parameter settings for all subsequent validation results.

In assessing the different classifier architecture, a validation procedure was performed where 10% of the UCEC slide patches (and as previously defined for CRC) were randomly chosen for validation. The other 90% of patches were used for training. All STAD patches were held out and reserved for validation testing only. Patches of different MSI status and different tumor types were sampled with equal probability each step, and each patch was trained at least once in each epoch. Several regularization techniques, including batch normalization and early stopping, were employed to optimize the training process and address overfitting. Prediction accuracy was measured by percent concordance between predicted and clinically determined MSI status (3 classes: MSI-H, MSI-L, and MSS).

In an example, the deep learning classifier was trained as follows. Let $x_I$ be a 1000×1000 px patch clipped from a slide. For each image $x_I$, the classifier defined its tumor type $t_I$ and its MSI status $m_I$, such that:

$$t_I = \begin{cases} 0 & \text{if } x_I \text{ belongs to } CRC \\ 1 & \text{if } x_I \text{ belongs to UCEC} \end{cases}$$

and $$m_l = \begin{cases} 0 & \text{if } x_l \text{ belongs to MSS} \\ 1 & \text{if } x_l \text{ belongs to } MSI\text{-}L \\ 2 & \text{if } x_l \text{ belongs to } MSI\text{-}H \end{cases}$$

In this example, in the final classifier model, the penultimate layer has 1024 variables, although fewer or great numbers of variables could be used. These 1024 variables are used as embeddings for a MSI status predictor classification (208). In an example, the MSI status predictor classification is implemented with one ReLU (rectified liner units) layer and one 1024×3 fully-connected layer. In other examples, any non-linearity can be introduced into the MSI predictor model, e.g., using any non-linear function such as ReLU, Tan h, or sigmoid to improve accuracy of the MSI predictor model.

In an example of the system 100, we evaluated pre-existing deep neural network architectures for the deep learning classifier, specifically, Inception-v3, VGG19, and ResNet-50. Before training the dedicated model for classifying MSI status, we initialized the model with parameters pre-trained on ImageNet. And as a result, we developed fully trained models fine-tuned for MSI classification end-to-end. We configured the system 100 to use the Adam optimization method with learning rate 1e-4 and betas=(0.9, 0.999). And for the examples illustrated, all models were implemented with PyTorch and all experiments were conducted on a GPU cluster.

FIG. 3 illustrates an example framework 300 implementation of the MSI deep learning framework 104 with similar elements to that of the framework 200, but configured in an adversarial deep learning framework, in which training images include digital H&E slide images and cancer type data. Similar deep learning classifier and 1024 variable embedding procedures were used in the framework 300 to identify one or more topology, morphology, and population features within the H&E slide images for predicting MSI status. However, the 1024 variables are used as embeddings for both MSI status predictor classification and a tumor predictor classification. That is, in addition to embeddings for MSI state, embeddings for tumor type classification, in an example, using a ReLU layer and one 1024×2 fully-connected layer, were used. The tumor predictor classification used a soft-max operation on the output that was interpreted as the probability of the classes. As with the MSI status predictor, other non-linear functions, such as Tan h and sigmoid, could be used in placed of the ReLU, and further a larger or smaller connected layer could be used.

The adversarial framework 300 provides MSI status predictor models that are more generalizable and robust to new tumor types, even when trained with cancer type-specific training sets. In design, we sought to eliminate cancer type-specific biases so that the models instead learned invariant high-dimensional representations of MSI. Indeed, the adversarial framework 300 is more generalizable and robust to not only new tumor types but new data domains more generally, including, for example, net data-source specific data. The adversarial framework 300 is able to account for variations in 'noise' in training medical image data and received medical image data and still develop MSI predictor models and make MSI predictions, whether such 'noise' is variations in tumor type or technical noise such as results from different types of medical image data sources (e.g., machines, hospitals, etc.).

In an example implementation, the framework 300 was configured with three components, in addition to a deep learning classifier 302: (i) An embedding 306 for some image patch: $R(x_i)$, (ii) an MSI status prediction classifier 308: $D_{MSI}(R(x_i))$, and (iii) a tumor type classifier 309, which is an example of a domain predictor that may compensate for variations in tumor type, data-source, etc.: $D_{Tumor}(R(x_i))$. For each mini-batch of samples, we trained the embedding and MSI predictor and tumor classifiers iteratively. We set a scalar weight for tumor type $\mu$=0.1.

In an example implementation of adversarial training, the framework 300 was configured to generate models more generalizable and robust to new tumor types and data domains, by using an unsupervised domain adaptation operation. For example, two dataset $S(x,y)$ and $T(x)$, called the source domain and target domain, where established. During training, there were no labels for the target domain data. Instead, the framework 300 was used to predict labels, with the objective being to learn domain invariant representation so that classifiers should generalize well on other domains. Formally, the framework 300 was configured to apply the following operation:

$$E(\theta_e, \theta_y, \theta_d) = \sum_{x_i \in S} L_y(D_y(G(x_i; \theta_e), \theta_y), y_i) + \quad (1)$$
$$\sum_{x_j \in S \cup T} L_d(D_d(G(x_j; \theta_e), \theta_y), d_j)$$

$D_d$ is the domain classifier and $\theta_d$ is its parameters, $x_i$ is a tile from domain. $y_i$ is the MSI label of $x_i$. $L_d$ is the cross entropy loss for domain classification $x_j$ is a tile from source domain or target domain. $d_j$ is the domain label.

$$y_i = \begin{cases} 0 & \text{if } x_i \text{ is } MSI\text{-}L/\text{MSS}, \\ 1 & \text{if } x_i \text{ is } MSI\text{-}H \end{cases} \quad (2)$$

$$d_j = \begin{cases} 0 & \text{if } x_j \text{ is from source domain,} \\ 1 & \text{if } x_j \text{ is from target domain} \end{cases} \quad (3)$$

The model of Equation (1) was optimized by the framework 300. During each step, the feature extractor and MSI classifier 308 were updated first, and then the domain classifier 309 was updated. In an example, a gradient reversal layer was added to the domain classifier after feature extractor. That gradient reversal layer forwards the outputs of former layers. However, during guided backpropagation 312 of the model interpreter 310, the gradient reversal layer passes inverse gradients to the proceeding layers. In this way, only one update was needed during each batch.

As shown, each of the frameworks 200 and 300 output an MSI status prediction, reflected as a coordinate of MSI-H (%), MSI-L (%), and MSS (%). As discussed in examples below, the adversarial framework 300, providing a generalizable and interpretable deep learning mode, is capable of predicting MSI status with more accuracy across a greater number of cancer types, even for cancer types not included in the training image set, as well as across a greater number of other domains, such as data source types.

Figure 4:
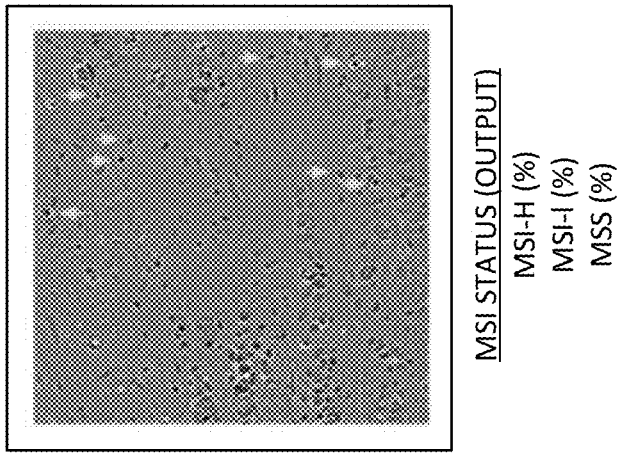
FIG. 4 illustrates example output from the schematic of FIG. 3, including predicted MSI states and visual representation of MSI status, in accordance with an example.
Figure 4:
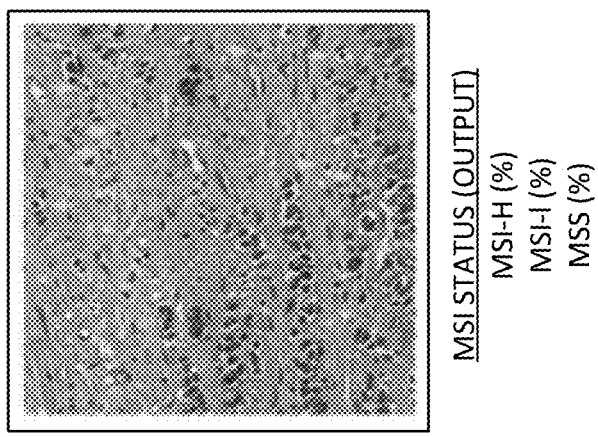

For the baseline non-adversarial framework 200 and for the adversarial framework 300 MSI predictor status is provided, along with the corresponding medical image, to a model interpreter (150, 210, 310) that may include a guided backpropagation procedure (152, 212, 312) to visualize salient image features associated with predicted MSI status as further discussed hereinbelow. The model interpreter examines an H&E digital image to identify pixels associated with the MSI classification. The interpreter can include for example a Gradient-weighted Class Activation Map. For example, the model interpreter collects from the MSI status predictor the assigned MSI status of the H&E digital image and then identifies those pixels or groups of pixels that correspond to the overall MSI prediction for the whole H&E digital image. The model interpreter then identifies those pixels or groups of pixels that coincide with the overall MSI prediction. We describe this process as a guided backpropagation. FIG. 4 illustrates an example of an H&E digital image in which the model interpreter generates a new rendition of the H&E digital image, with the pixel or pixel group locations associated with the MSI prediction. In this way, the model interpreter provides healthcare professionals with a visual indication of the locations in a medical image where the MSI state is evident.

Figure 5:
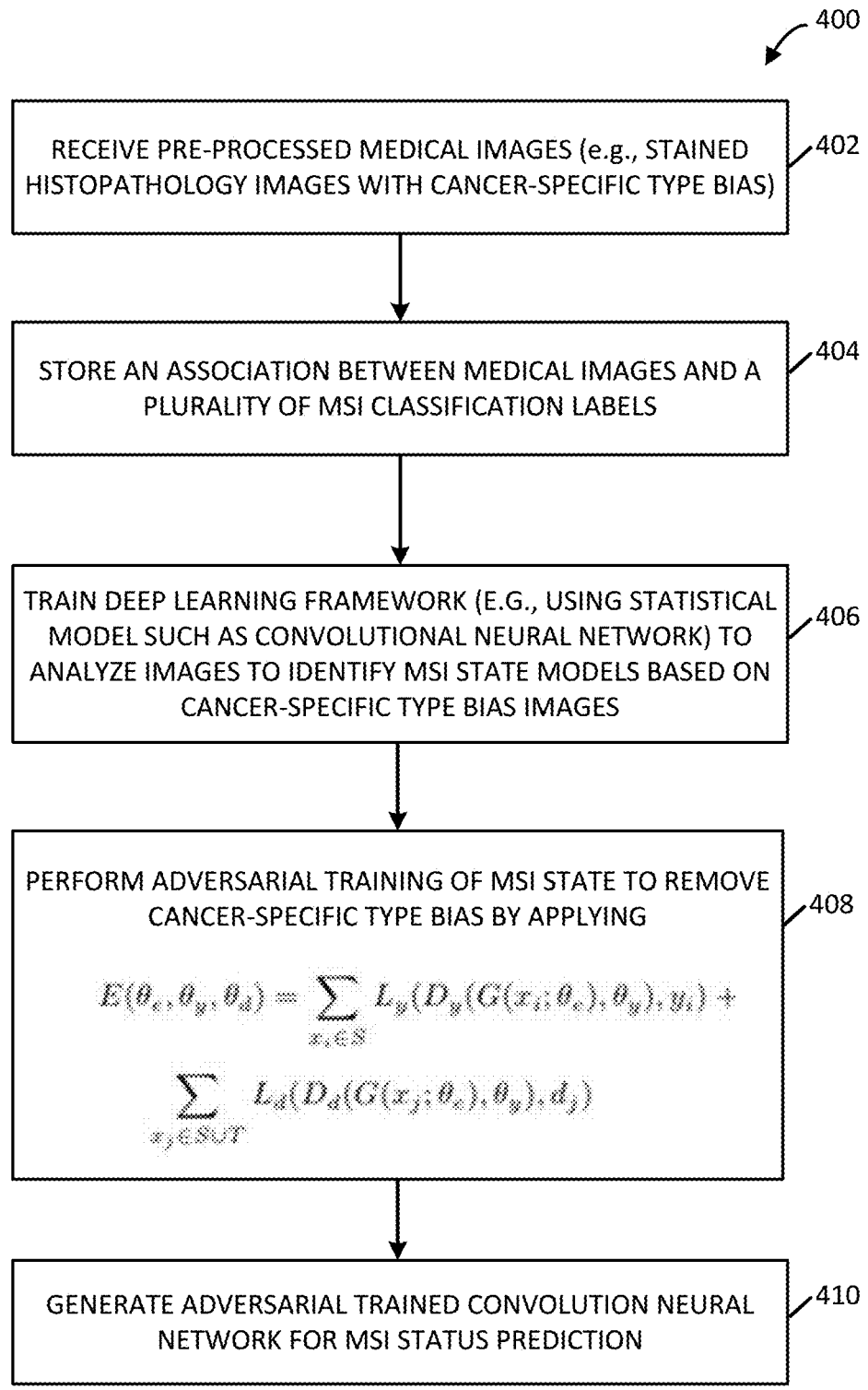
FIG. 5 is a block diagram of an example method for performing adversarial training of a deep learning framework to develop an MSI predictor model and a tumor predictor model.

FIG. 5 illustrates an example process 400 for performing adversarial training of a deep learning framework to develop an MSI predictor classifier model and a tumor predictor classifier model. As shown, in training state, initially pre-processed medical images (e.g., stained histopathology images with cancer-specific type bias) are received (402). In a training procedure, an association between the medial images and a plurality of MSI classification labels may be performed (404). Then a deep learning framework (e.g., convolutional neural network, at 406) is trained to analyze images to generate an MSI state predictor model based on cancer-specific type bias images. Broadly speaking, the deep learning framework may implement any suitable statistical model (e.g., a neural network or other model implemented through a machine learning process) that will be applied to each of the received images. As discussed herein, that statistical model may be implemented in a variety of manners. In some examples, machine learning is used to evaluate training images and develop classifiers that correlate predetermined image features to specific categories of MSI status. For example, image features can be identified as training classifiers using a learning algorithm such as Neural Network, Support Vector Machine (SVM) or other machine learning process. Once classifiers within the statistical model are adequately trained with a series of training images, the statistical model may be employed in real time to analyze subsequent images provided as input to the statistical model for predicting MSI status. In some examples, when statistical model implemented using a neural network, the neural network may be configured in a variety of ways. In some examples, the neural network may be a deep neural network and/or a convolutional neural network. In some examples, the neural network can be a distributed and scalable neural network. The neural network may be customized in a variety of manners, including providing a specific top layer such as but not limited to a logistics regression top layer. A convolutional neural network can be considered as a neural network that contains sets of nodes with tied parameters. A deep convolutional neural network can be considered as having a stacked structure with a plurality of layers. The neural network or other machine learning processes may include many different sizes, numbers of layers and levels of connectedness. Some layers can correspond to stacked convolutional layers (optionally followed by contrast normalization and max-pooling) followed by one or more fully-connected layers. For neural networks trained by large datasets, the number of layers and layer size can be increased by using dropout to address the potential problem of overfitting. In some instances, a neural network can be designed to forego the use of fully connected upper layers at the top of the network. By forcing the network to go through dimensionality reduction in middle layers, a neural network model can be designed that is quite deep, while dramatically reducing the number of learned parameters.

Either simultaneously or iteratively, the method further includes adversarial training of the MSI state predictor model to remove cancer-specific type bias (408). For example, the method applies Equations (1), (2), and (3) in an alternating manner to apply adversarial training. The result is that the method generates adversarial trained convolution neural network for MSI status prediction (410), i.e., an adversarial trained MSI status predictor model.

Figure 6:
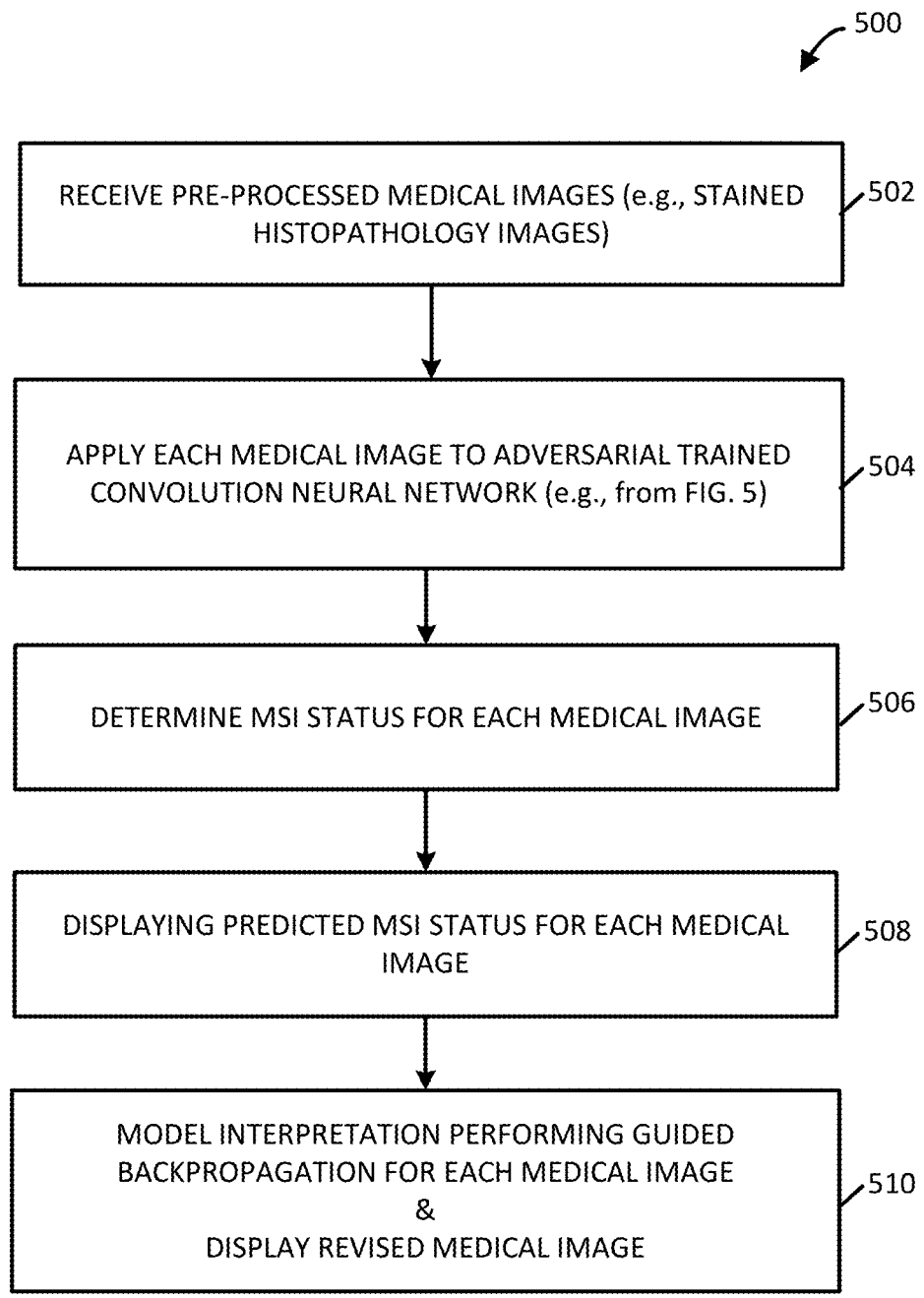
FIG. 6 is a block diagram of an example method for performing MSI prediction on received testing medical images using the adversarial trained deep learning framework of FIG. 3, in accordance with an example.

FIG. 6 illustrates an example process 500 for performing MSI prediction and tumor prediction on received testing medical images using the adversarial trained deep learning framework of FIG. 3, e.g., after the process 400. Initially, pre-processed medical images are received (502), and each is applied to the adversarial trained convolution neural network (504), which determines MSI status for each medical image (506) and displays the MSI status predictions (508), and which then performs model interpretation and guided backpropagation for each medical image, which may then be displayed to healthcare personal or to a patient directly (510).

EXAMPLES

While any deep learning framework may be used (e.g., VGG19, Inception-v3, and ResNet-50), for the testing examples described further below, the processing system 100 was configured to use Inception-V3, in an example.

To provide comparisons, we used the framework 200 of FIG. 2 to characterize how well a deep learning model trained using a single tumor type generalizes to a new, different tumor type when predicting MSI status. MSI has been reported with high incidence in sporadic endometrial carcinoma.

In an example, the framework 200 trained individual deep learning models, end-to-end, in a cancer-type specific manner utilizing the non-overlapping training, validation and testing slides to predict MSI status.

In an example, after averaging the MSI prediction probabilities from all patches in a specific slide, the framework 200 was able to generate an average area under the curve (AUC) of 0.83, which included an AUC of 0.85 (CI=0.64-0.95) for COAD, an AUC of 0.84 (CI=0.62-0.95) for UCEC, and an AUC of 0.82 (CI=0.52-0.95) for STAD. Collectively, that showed that the framework 200 was able to generate individual cancer specific models capable of learning and predicting MSI status directly from H&E histopathology images.

Figure 10A:
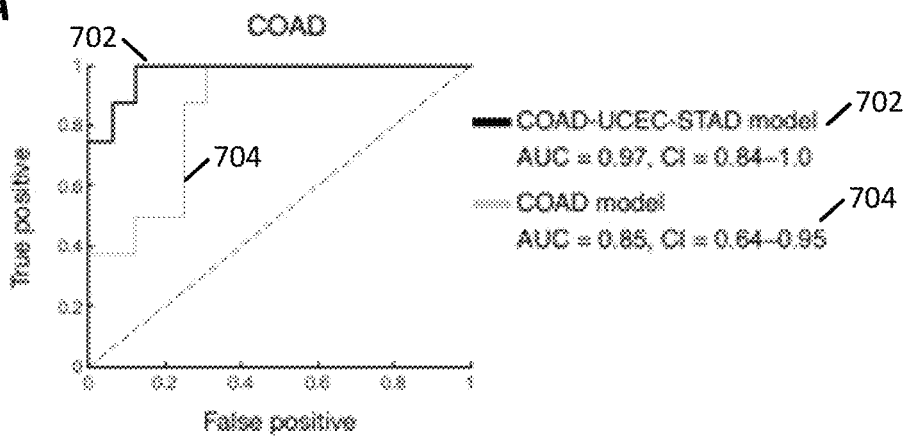
FIGS. 10A, 10B, and 10C are plots of true positive and false positive values, and areas under curve (AUC) analyses, as measured for three different cancer types (colon adenocarcinoma (COAD), uterine corpus endometrial carcinoma (UCEC), and stomach adenocarcinoma (STAD)), respectively, in accordance with an example.
Figure 10B:
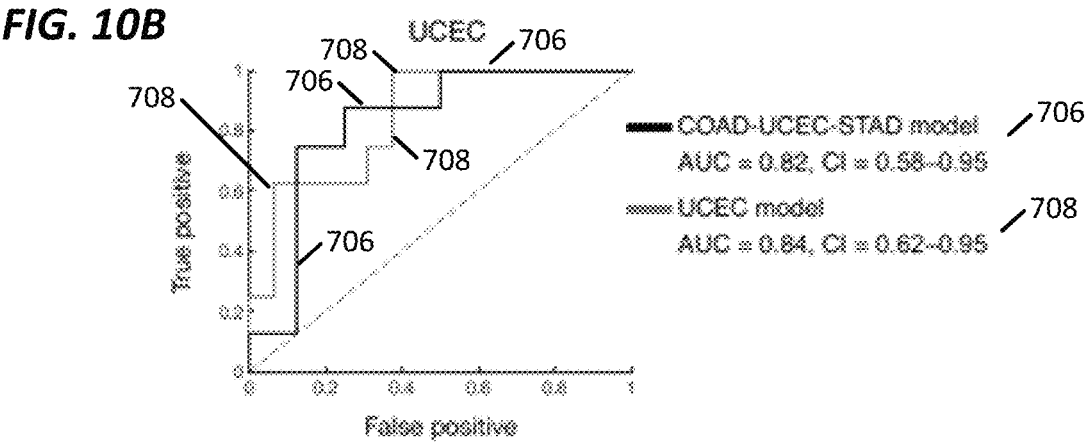
Figure 10C:
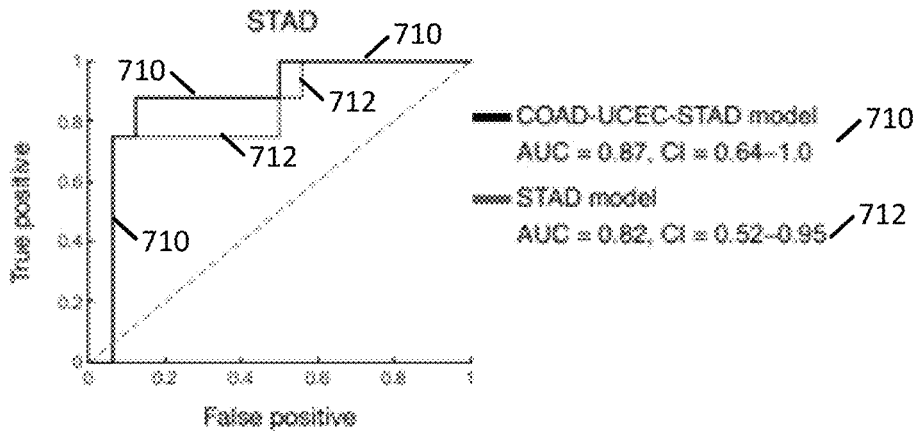

Nevertheless, given the large learning capacity available in deep learning networks, we sought to compare the performance to a single joint model trained using all cancer types. To do this, we used the framework 200 to generate a single model trained using an equal proportion of patches from 3 cancer types (COAD, UCEC, and STAD). This joint model (COAD-UCEC-STAD-model) we evaluated on each cancer type separately and demonstrated an improved average AUC of 0.88, which included an AUC of 0.97 (CI=0.84-1.0) for COAD (plot 702 of the COAD-UCEC-STAD model versus the COAD model 704), an AUC of 0.82 (CI=0.58-0.95) for UCEC (plot 706 of the COAD-UCEC-STAD model versus the UCEC model 708), and an AUC of 0.87 (CI=0.64-1.0) for STAD (plot 710 of the COAD-UCEC-STAD model versus the STAD model 712) (with AUC data plotted in FIGS. 10A, 10B, and 10C). Taken together, the results from these implementations of the framework 200 show that deep neural networks have sufficient learning capacity to be jointly trained using multiple tissue types. For example, we observed increases in AUC for COAD (+0.12) and STAD (+0.05). That also demonstrates that access to other tissue morphologies (e.g., in the gastrointestinal tract, in this case), can have a beneficial augmentation or regularization effect that allows for improved predictions.

These results show that conventional deep learning models, such as implemented in the techniques herein, provide a novel, integrative and robust approach for predicting MSI status directly from whole-slide H&E images.

Collectively, these results show that while deep learning models can provide a useful approach for predicting MSI status using the framework 200

Figure 11A:
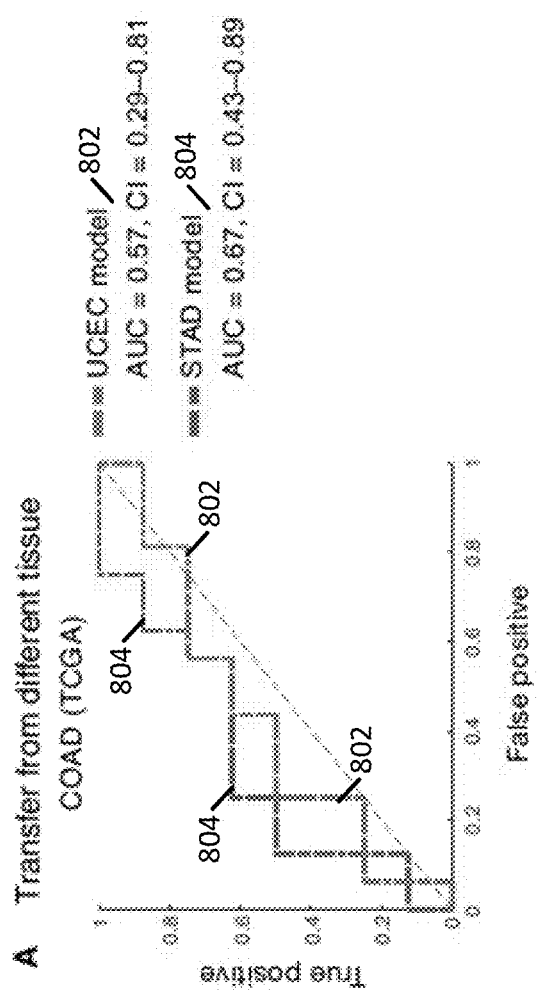
FIGS. 11A and 11B are plots of true positive and false positive values for COAD for two different data sources, in accordance with an example.

We also examined the generalizability of the frameworks herein and their deep learning models to new data sources in two scenarios. First, we used the framework 200 to characterize the performance of a deep learning model on data sources containing new tissue types, not observed in the training dataset. Because MSI status is not anatomically restricted to a specific cancer type (or cancer types), in some examples, the techniques herein are configured to generate an MSI prediction model able to predict MSI status across a range of cancer types including those that are not observed in training. In an example implementation, we examined COAD as a useful baseline for evaluating MSI status prediction, as it is found in approximately 15% of stage II to III colorectal cancers. Using the framework 300, we found that a UCEC trained model resulted in an AUC of 0.57 (CI=0.29-0.81), and a STAD trained model resulted in an AUC=0.67 (CI=0.43-0.89) (FIG. 11A, plots 802 and 804). Although the AUC suggests some nominal transfer between tissue types, the gap between performances of models trained with COAD instances and without instances suggests that deep learning digital pathology models may tend to overfit to tissue types observed in training.

Figure 11B:
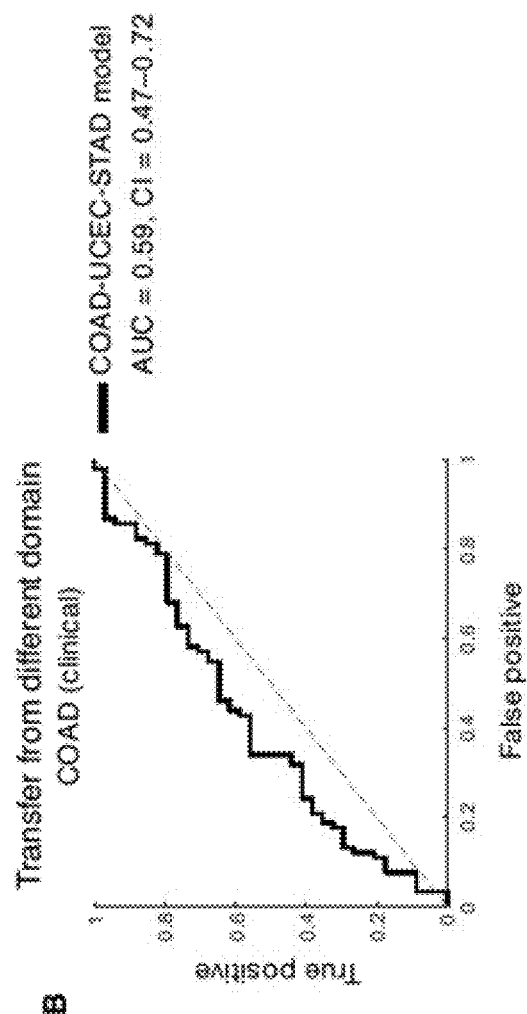

We also characterized the performance of our deep learning model generated by the framework 300 on tissue types observed in training but from a new data source, where the joint trained TCGA model was evaluated using a non-TCGA COAD dataset from a clinical testing source. We found the joint trained model resulted in an AUC of 0.59 (CI=0.47-0.72) (FIG. 11B).

Although the AUC again suggests some nominal transfer between data sources, models trained on TCGA may tend to overfit to intrinsic data source biases, such as specific biospecimen fixation, embedding, and staining protocols and pathology imaging instrumentation and settings. Notably, this decrease on performance between TCGA trained models and non-TCGA data has been observed before.

Figure 11C:
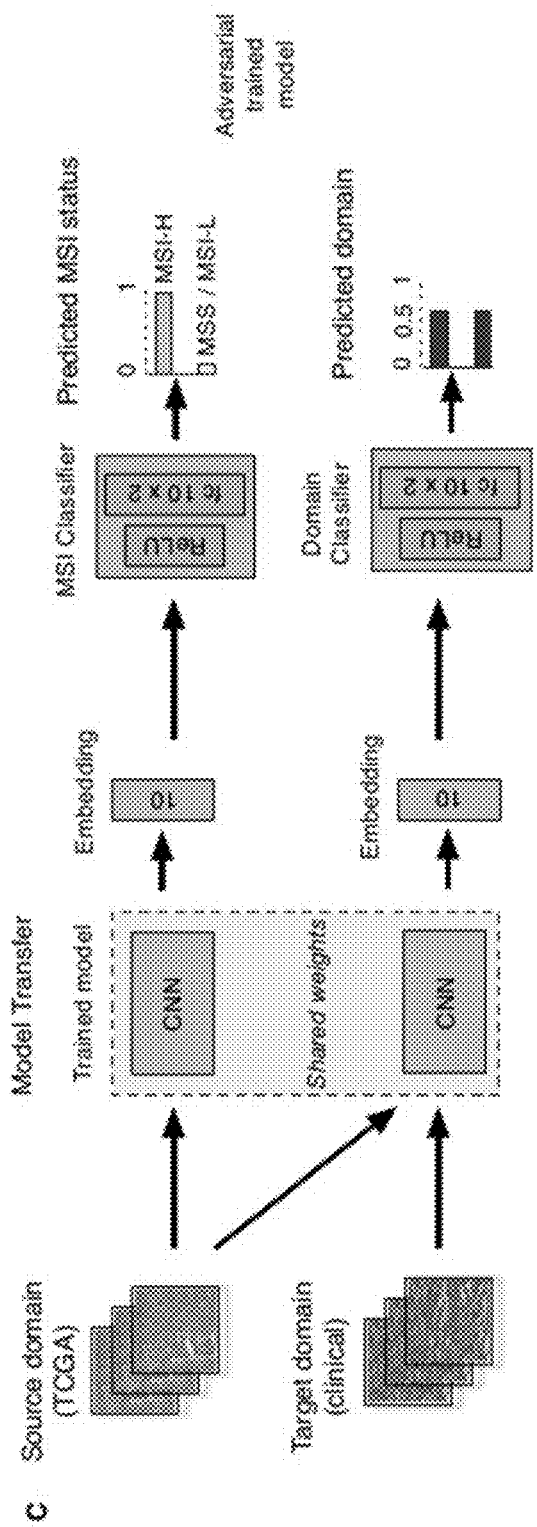
FIG. 11C illustrates an example MSI prediction process implemented by the adversarial trained framework of FIG. 3, in accordance with an example.

Therefore, we characterized the performance of an adversarial trained model generated by the framework 300. To do this, in an example, we configured the adversarial training process herein (e.g., FIG. 3) to transfer learning from TCGA source domain to new target domains. We used the framework 300 having two classifiers (FIG. 11C), one for predicting MSI status and the other for predicting data source. However, by design in an example, we configured the framework 300 to predict MSI status well and data source poorly, as a model that successfully predicts data source is likely learning features of the source biases rather than generalizable, biological features of MSI. In this example, the configuration was accomplished by orienting the data source classifier into an adversarial objective, which causes the MSI predictive model to adjust and satisfy the duelling objectives. As a result, the deep learning model generated by the framework reduced cancer data source biases and instead learned invariant high-dimensional representations of MSI.

Figure 11D:
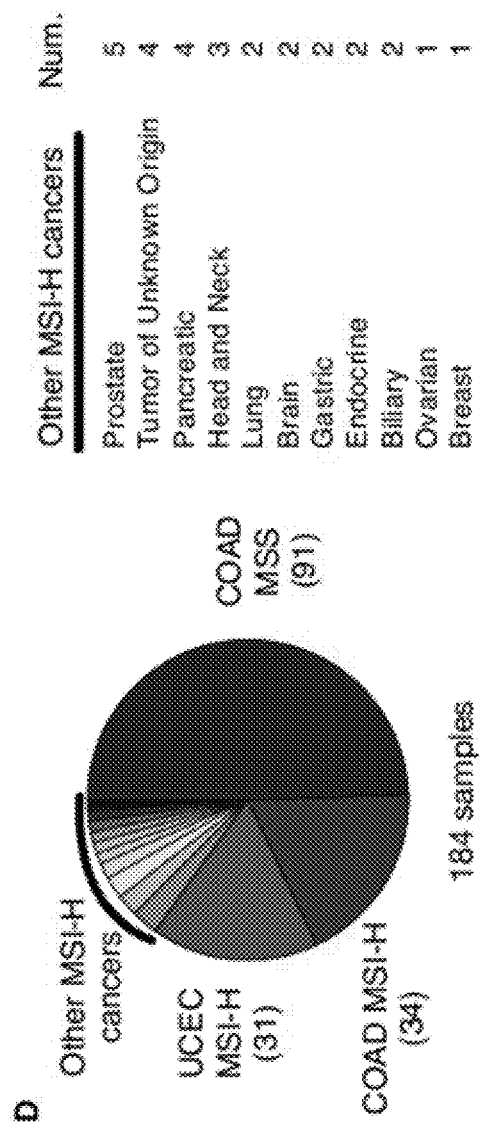
FIG. 11D illustrates 13 diverse MSI-H cancer types examined, with slide images, using the MSI prediction process of FIG. 11C.
Figure 11E:
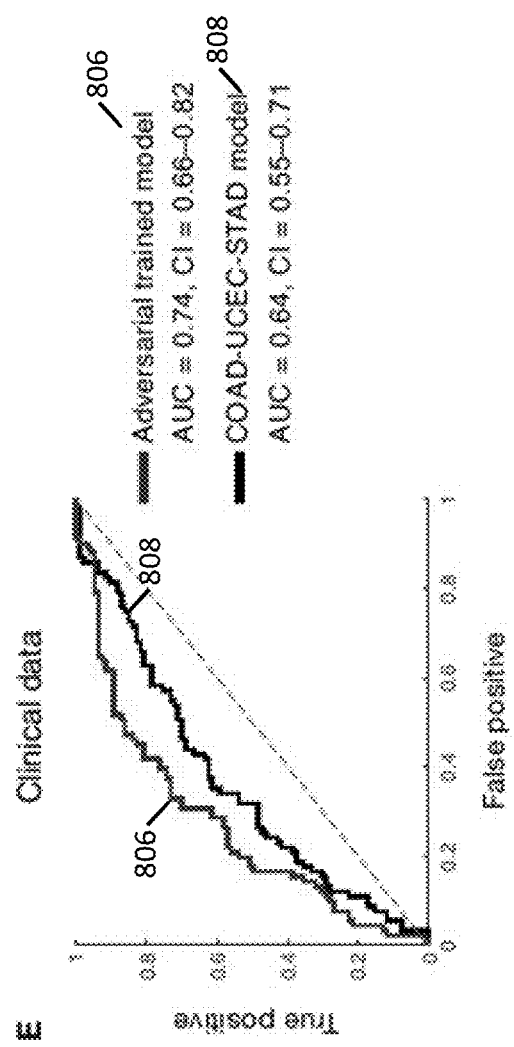
FIG. 11E is a plot of true positives versus false positives showing the example performance of an adversarial trained model compared to a The Cancer Genome Atlas (TCGA) joint trained model.

To demonstrate the broad applicability of this adversarial training to other cancer types and domains, in an example, we obtained 184 H&E slide images from 13 diverse MSI-H cancer types (FIG. 11D). The adversarial trained model of framework 300 resulted in a performance of 0.74 AUC (CI=0.66-0.82) compared to the TCGA joint trained model AUC of 0.64 (CI=0.55-0.71) (FIG. 11E, plots 806 and 808). There is a marked increase in performance (+0.1) using adversarial training, suggesting that domain adaption techniques can greatly improve the generalizability of deep learning models. We anticipate that other external clinical datasets with intrinsic biases and tissue compositions more similar to TCGA training data may receive greater benefits from adversarial training and consequently demonstrate greater performance.

We further used the framework 200 to provide a visual indication of the MSI predictions—although any of the frameworks herein are able to provide such visual indication. Broadly, while the visual indications can be achieved in different ways, in these particular examples, visual indications were generated to understand what components of the medical images are used by an adversarial trained model when deciding on MSI status. In an example, the guided backpropagation controller was used to generate these visual indications and to demonstrate how different features and details on images influence MSI predictions.

In an example, the guided backpropagation controller was configured to connect MSI prediction to specific features and details on test medical images, e.g., in histopathology images. The guided backpropagation controller was used to reveal the gradient of the first layer in the adversarial trained MSI predictor model. In particular, the guided backpropagation controller was used to visualize activations of specific pixels associated with MSI status, and therefore to provide medical practitioners a high level understanding of what features and details on images influence MSI predictions.

Figure 7:
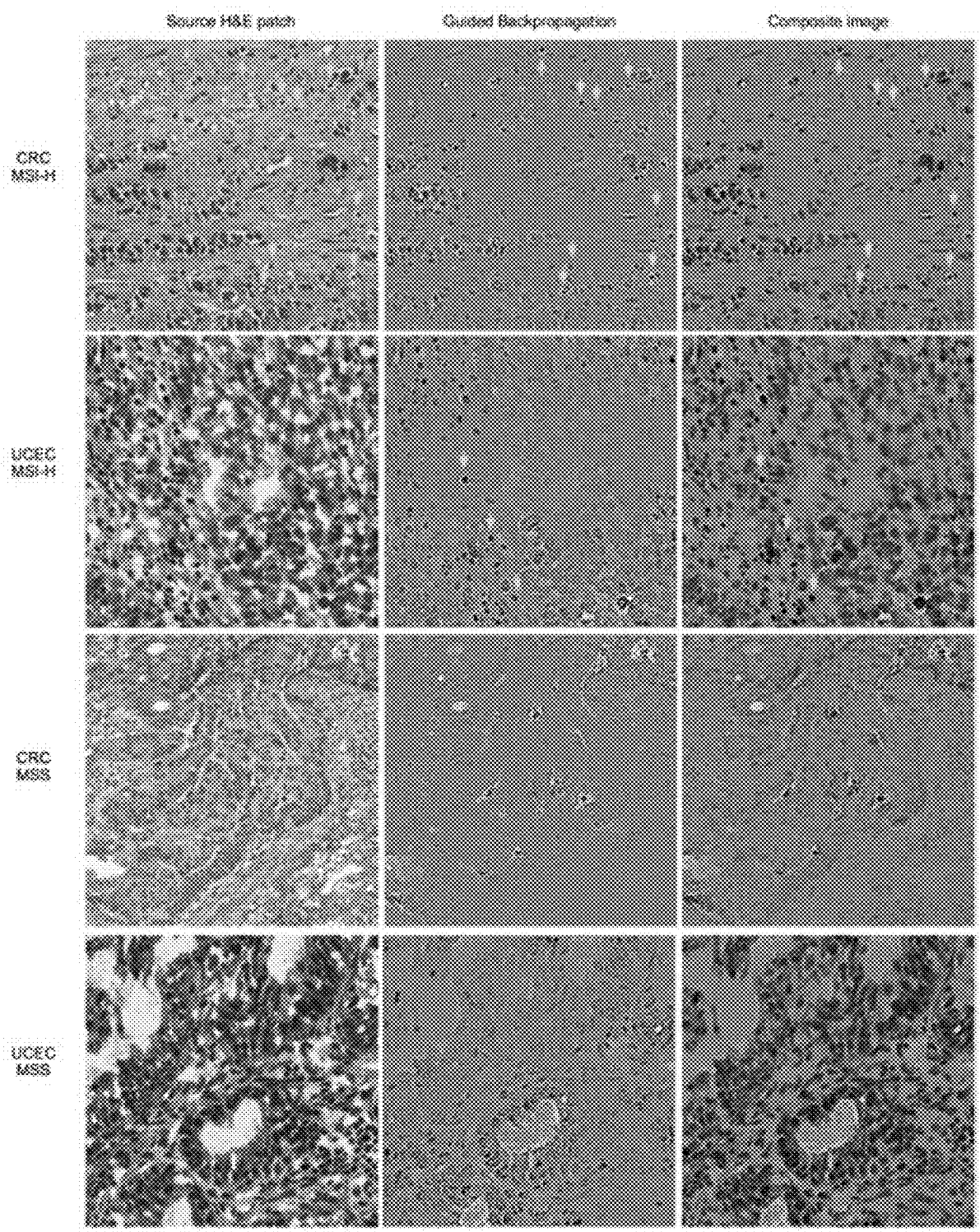
FIG. 7 illustrates representative histopathology slides from CRC and UCEC tumors with MSI-H and MSS classifications. Infiltrating lymphocytes are identified as activated features in both MSI-H CRC and UCEC. These cells are characterized by condensed nuclei and a small cytoplasmic halo, which shows distinct observable activation by a model interpreter (indicated by green arrows). Analysis of MSS CRC and UCEC cases showed non-specific morphologic feature activation identifying glandular structures and tissue interfaces.

For example, we sampled multiple UCEC and CRC based medical images, from the MSI-H and MSS clusters. MSI-H and MSS are clinically well defined, whereas MSI-L is thought be an intermediate or equivocal state. We present representative patches in FIG. 7. We observed that MSI-H patches show activations around potential patterns of infiltrating immune cells. Here a distinct activation (white) around a round cell with large nucleus (black) suggests instances of lymphocytic infiltrate. Tumors with MSI-H are often characterized by strong infiltration of the tumor microenvironment with lymphocytes such as CD8+ cytotoxic T cells, CD4+T helper 1 cells and natural killer cells. In contrast, for MSS patches we observed activation of larger tissue level, morphological features, such as glandular structures and non-specific tissue interfaces and voids within tumors. These features are generalizable across adenocarcinomas and may represent the identification of common features in MSS cases for these disease types.

Overall, the visualization of our adversarial learned embeddings demonstrates shared feature representations within MSI classes. Furthermore, the inspection of histopathology images associated with MSI classes through guided backpropagation implicates clinically interpretable class-discriminative features, such as immune infiltration.

For more than half a century, manual evaluation of histopathology slides by experienced pathologists has remained the standard for identifying potential clinically actionable pathologic features for different cancers. With the present disclosure, we introduce a novel deep learning framework that predicts MSI status directly from haematoxylin and eosin stained histopathology slide images. The result is generalizable and interpretable framework for modeling histopathology slide images, and which holds the potential for substantial clinical impact, including broadening access to MSI testing by "pre-screening" for MSI cancers, with a follow-up screen made with either IHC or DNA analysis.

As shown, our results demonstrate that a deep learning framework can be used to determine MSI status in a tumor specific manner, and importantly, we provide an approach to identify pathologic features such as immune infiltrate that are clinically interpretable by pathologists. The identification of clinically interpretable and biologically supported features is a valuable for the widespread adoption of deep learning models in clinical medicine.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components or multiple components. For example, references and illustrates herein to a "motion capture device," motion capturing hardware device, and the like, include references to multiple ones of these devices as may be used attached to and/or separately spaced from a user. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a microcontroller, field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of the example methods described herein can be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method can be performed by one or more processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as an example only and does not describe every possible embodiment, as describing every possible embodiment would be impractical, if not impossible. One could implement numerous alternate embodiments, using either current technology or technology developed after the filing date of this application.

What is claimed:

1. A computing device configured to generate an image-based microsatellite instability (MSI) prediction model, the computing device comprising one or more processors configured to:
   obtain, via one or more processors, a set of stained histopathology images from one or more image sources, the set of stained histopathology images having a first cancer type-specific bias or a first data source-specific bias;
   store in an electronic database, using the one or more computing devices, an association between the histopathology slide images and the plurality of MSI classification labels;
   apply, via one or more processors, a statistical model to analyze the set of stained histopathology images and generate an initial baseline MSI prediction model, the initial baseline MSI prediction model exhibiting cancer type-specific bias or data source-specific bias;
   apply, via one or more processors, an adversarial training to the baseline MSI prediction model; and
   generate, via one or more processors, an adversarial trained MSI prediction model configured to predict MSI status for subsequent stained histopathology images,
      the adversarial trained MSI prediction model characterized by a reduction in cancer type-specific bias or data source-specific bias in comparison to the initial baseline MSI prediction status model, and
      the adversarial trained MSI prediction model configured to predict an MSI status including at least two of: (i) Microsatellite-High (MSI-H); (ii) Microsatellite-Stable (MSS); or Microsatellite-Low (MSI-L).

2. The computing device of claim 1, wherein the statistical model is a Neural Network or Support Vector Machine (SVM).

3. The computing device of claim 1, wherein the one or more processors are configured to:
   obtain at least one of the subsequent stained histopathology images;
   apply the adversarial trained MSI prediction model to the at least one subsequent stained histopathology image and predict MSI status;
   examine the at least one subsequent stained histopathology image and identify patches associated with the MSI status; and
   generate a guided backpropagation histopathology image from the at least one subsequent stained histopathology image, the guided backpropagation histopathology image depicting the patches associated with the MSI status.

4. The computing device of claim 3, wherein the patches comprise pixels or groups of pixels.

5. The computing device of claim 3, wherein the patches are characterized by topology and/or morphology of pixels or groups of pixels.

6. The computing device of claim 3, wherein the one or more processors are configured to examine the at least one subsequent stained histopathology image and identify the patches associated with the MSI status using a gradient-weighted class activation map.

7. The computing device of claim 1, wherein the statistical model is a machine learning process.

8. A computer-implemented method to generate an image-based microsatellite instability (MSI) prediction model, the method comprising:
   obtaining, via one or more processors, a set of stained histopathology images from one or more image sources, the set of stained histopathology images having a first cancer type-specific bias or a first data source-specific bias;
   storing in an electronic database, using the one or more computing devices, an association between the histopathology slide images and the plurality of MSI classification labels;
   applying, via one or more processors, a statistical model to analyze the set of stained histopathology images and generating an initial baseline MSI prediction model, the initial baseline MSI prediction model exhibiting cancer type-specific bias or data source-specific bias;

applying, via one or more processors, an adversarial training to the initial baseline MSI prediction model; and generating, via one or more processors, an adversarial trained MSI prediction model configured to predict MSI status for subsequent stained histopathology images, the adversarial trained MSI prediction model characterized by a reduction in cancer type-specific bias or data source-specific bias in comparison to the initial baseline MSI prediction status model, and the adversarial trained MSI prediction model configured to predict an MSI status including at least two of: (i) Microsatellite-High (MSI-H); (ii) Microsatellite-Stable (MSS); or Microsatellite-Low (MSI-L).

9. A computing device configured to generate an image-based microsatellite instability (MSI) prediction model, the computing device comprising one or more processors configured to:

obtain, via one or more processors, a set of stained histopathology images from one or more image sources, the set of stained histopathology images having a first cancer type-specific bias or a first data source-specific bias;

store, via one or more processors, in an electronic database, using the one or more computing devices, an association between the histopathology slide images and the plurality of MSI classification labels; and apply, via one or more processors, a statistical model to analyze the set of stained histopathology images; and generate, via one or more processors, an adversarial trained MSI prediction model configured to predict MSI status for subsequent stained histopathology images, the adversarial trained MSI prediction model characterized by a reduction in cancer type-specific bias or data source-specific bias in comparison to the initial baseline MSI prediction status model, and the adversarial trained MSI prediction model configured to predict an MSI status including at least two of: (i) Microsatellite-High (MSI-H); (ii) Microsatellite-Stable (MSS); or Microsatellite-Low (MSI-L).

10. The computing device of claim 9, wherein the statistical model is a Neural Network or Support Vector Machine (SVM).

11. The computing device of claim 9, wherein the one or more processors are configured to:

obtain at least one of the subsequent stained histopathology images;

apply the trained MSI prediction model to the at least one subsequent stained histopathology image and predict MSI status;

examine the at least one subsequent stained histopathology image and identify patches associated with the MSI status; and generate a guided backpropagation histopathology image from the at least one subsequent stained histopathology image, the guided backpropagation histopathology image depicting the patches associated with the MSI status.

12. The computing device of claim 11, wherein the patches comprise pixel or groups of pixels.

13. The computing device of claim 11, wherein the patches are characterized by topology and/or morphology of pixels or groups of pixels.

14. The computing device of claim 11, wherein the one or more processors are configured to examine the at least one subsequent stained histopathology image and identify the patches associated with the MSI status using a gradient-weighted class activation map.

15. The computing device of claim 9, wherein the statistical model is a machine learning process.

* * * * *